US010652156B2

(12) United States Patent
Li et al.

(10) Patent No.: US 10,652,156 B2
(45) Date of Patent: May 12, 2020

(54) METHOD, APPARATUS AND DEVICE FOR MULTICAST AND UNICAST COMMUNICATIONS OF RTP PACKETS

(71) Applicant: Huawei Technologies Co., Ltd., Shenzhen (CN)

(72) Inventors: Zhiming Li, Reading (GB); Longyu Cao, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 49 days.

(21) Appl. No.: 15/845,792

(22) Filed: Dec. 18, 2017

(65) Prior Publication Data

US 2018/0123962 A1  May 3, 2018

Related U.S. Application Data

(63) Continuation of application No. PCT/CN2015/081996, filed on Jun. 19, 2015.

(51) Int. Cl.
*H04L 12/853* (2013.01)
*H04L 29/06* (2006.01)
(Continued)

(52) U.S. Cl.
CPC ...... *H04L 47/2416* (2013.01); *H04L 43/0852* (2013.01); *H04L 65/4076* (2013.01);
(Continued)

(58) Field of Classification Search
CPC . H04L 47/2416; H04L 65/80; H04L 65/4076; H04L 65/608; H04L 43/0852;
(Continued)

(56) References Cited

U.S. PATENT DOCUMENTS

2002/0132579 A1* 9/2002 Hart ................. G09B 23/181
455/12.1
2006/0068790 A1* 3/2006 Sawamoto ........... H04B 1/7113
455/441
(Continued)

FOREIGN PATENT DOCUMENTS

CN   101009825 A   8/2007
CN   101242581 A   8/2008
(Continued)

OTHER PUBLICATIONS

3GPP TS 23.468 V12.5.0, 3rd Generation Partnership Project; Technical Specification Group Services and System Aspects; Group Communication System Enablers for LTE (GCSE_LTE); Stage 2 (Release 12), 30 pages, Jun. 2015.
(Continued)

*Primary Examiner* — Mounir Moutaouakil
(74) *Attorney, Agent, or Firm* — Slater Matsil, LLP

(57) ABSTRACT

When a Real-Time Transport Protocol (RTP) packet receiving manner of a user equipment (UE) is switched between a unicast transmission manner and a multicast transmission manner, a group communication service application server (GCS AS) obtains a time difference between a time at which the UE receives a first RTP packet before the switching and a time at which the UE receives a second RTP packet after the switching. The GCS AS calculates a delay difference, according to the time difference, of RTP packet transmissions in different transmission manners, and adjusts, according to the delay difference, timing for RTP packet transmission in the unicast transmission manner.

16 Claims, 10 Drawing Sheets

(51) Int. Cl.
*H04W 4/08* (2009.01)
*H04W 4/06* (2009.01)
*H04L 12/26* (2006.01)
*H04L 29/08* (2006.01)

(52) U.S. Cl.
CPC ............ *H04L 65/608* (2013.01); *H04L 65/80* (2013.01); *H04W 4/06* (2013.01); *H04W 4/08* (2013.01); *H04L 65/403* (2013.01); *H04L 67/02* (2013.01)

(58) Field of Classification Search
CPC ........ H04L 65/403; H04L 67/02; H04W 4/08; H04W 4/06
See application file for complete search history.

(56) References Cited

U.S. PATENT DOCUMENTS

| | | | |
|---|---|---|---|
| 2009/0110132 A1 | 4/2009 | Kondrad et al. | |
| 2012/0278845 A1* | 11/2012 | Ou | H04L 1/1835 725/93 |
| 2012/0304236 A1 | 11/2012 | Qiu et al. | |
| 2013/0039251 A1* | 2/2013 | Wilkinson | H04W 36/0007 370/312 |
| 2015/0030022 A1* | 1/2015 | Mantin | H04L 65/80 370/390 |
| 2015/0304974 A1* | 10/2015 | Shibuta | H04W 56/00 370/338 |
| 2016/0308928 A1* | 10/2016 | Gholmieh | H04L 67/02 |
| 2016/0323846 A1* | 11/2016 | Park | H04L 5/0069 |
| 2017/0006362 A1* | 1/2017 | Shang | H04B 10/0793 |
| 2017/0118683 A1* | 4/2017 | Son | H04L 51/10 |
| 2017/0295029 A1* | 10/2017 | Li | H04W 56/00 |
| 2019/0149898 A1* | 5/2019 | Shang | H04Q 11/0066 |

FOREIGN PATENT DOCUMENTS

| | | | |
|---|---|---|---|
| CN | 101340558 A | | 1/2009 |
| CN | 101547108 A | | 9/2009 |
| CN | 101854533 A | | 10/2010 |
| CN | 101889418 A | | 11/2010 |
| CN | 102870461 A | | 1/2013 |
| CN | 101888664 B | * | 4/2013 |
| EP | 1719302 B1 | | 10/2008 |
| WO | 2009053899 A2 | | 4/2009 |

OTHER PUBLICATIONS

3GPP TR 36.868 V2.0.0, 3rd Generation Partnership Project; Technical Specification Group Radio Access Network; Evolved Universal Terrestrial Radio Access (E-UTRA); Study on Group Communication for E-UTRA (Release 12), 25 pages, Feb. 2014.

H. Schulzrinne et al.,"RTP: A Transport Protocol for Real-Time Applications", Request for Comments: 3550, Network Working Group, 89 pages, Jul. 2003.

3GPP TSG-SA4 Meeting #83 S4-150475 (revision of S4-150281), "user experience issue in MCPTT support", Huawei, 2 pages, Apr. 13-17, 2015, Bratislava, Slovakia.

* cited by examiner

METHOD, APPARATUS AND DEVICE FOR MULTICAST AND UNICAST COMMUNICATIONS OF RTP PACKETS

CROSS-REFERENCE TO RELATED APPLICATIONS

This application is a continuation of International Application No. PCT/CN2015/081996, filed on Jun. 19, 2015, which is hereby incorporated by reference in its entirety.

TECHNICAL FIELD

The present invention relates to the field of communications technologies, and in particular, to a group communications method, apparatus, and device.

BACKGROUND

A group communications system can be a special communications system with a scheduling capability. The special communications system can provide a unidirectional call capability, and allow a user equipment (UE) to communicate with one or more other UEs. As increasingly rich mobile services and Long Term Evolution (LTE) technologies develop, it may be possible to implement rich group services in a common LTE network. In LTE group communication, data may be transmitted in a unicast manner and a multicast manner. In the multicast transmission manner of the group communication, data is transmitted by using an existing multimedia broadcast/multicast service (MBMS) technology.

In an LTE group communications system architecture, a group communication service application server (GCS AS) may be disposed on a network side. The GCS AS can be a third-party application server, and can be configured to implement functions such as group member management and MBMS bearer activation initiation in a group communication process. Generally, the GCS AS transmits data based on the Real-Time Transport Protocol (RTP). When the GCS AS needs to send data, the GCS AS may transmit the data in the unicast manner and the multicast manner.

FIG. 1 is a schematic diagram of structural composition of a user plane in a group communications system. If the GCS AS sends an RTP packet in the unicast manner, the GCS AS sends the RTP packet to UE by using a packet data network (PDN), and the UE receives the packet from the GCS AS. If the GCS AS sends an RTP packet in the multicast manner, the GCS AS first sends the RTP packet to a broadcast/multicast service center (BM-SC). After receiving the RTP packet, the BM-SC does not modify the RTP packet, but only binds an IP data flow from the GCS AS to a corresponding MBMS bearer, and then sends the RTP packet from the GCS AS to UE by using an MBMS gateway (MBMS GW) and an EnodeB or Evolved Node B (eNB). The UE receives the packet from the BM-SC. An RTP packet transmission scheduling period is 20 ms, and a unicast transmission delay is 40 ms, that is, a delay between a time at which the GCS AS starts to send the first RTP packet and a time at which the UE receives, by means of unicast, the first RTP packet sent by the GCS AS is 40 ms. A multicast transmission delay is 160 ms.

As a UE location changes, a manner of transmitting an RTP packet between the GCS AS and the UE also changes. As shown in FIG. 2, in a moving process, the UE may move from a unicast coverage to an MBMS coverage, and the manner of transmitting an RTP packet between the GCS AS and the UE is switched from the unicast manner to the multicast manner. Conversely, when the UE moves from the MBMS coverage to the unicast coverage, the manner of transmitting an RTP packet between the GCS AS and the UE is switched from the multicast manner to the unicast manner.

The unicast manner is different from the multicast manner in terms of an RTP packet transmission delay. As such, RTP packets received by the UE on different data transmission paths that are used before and after switching may become out of order and out of synchronization. For example, a packet may be lost or repeatedly received.

SUMMARY

Embodiments of a group communication method, apparatus, and device, are described in this specification, to resolve the following problem: having the RTP packet, which is received by UE on different data transmission paths that are used before and after switching, become out of order and out of synchronization, and, for example, then lost or repeatedly received.

A first aspect provides a group communication method that includes, when a Real-Time Transport Protocol (RTP) packet receiving manner of a user equipment (UE) is switched, obtaining, by a group communication service application server (GCS AS), a time difference between a time at which the UE receives a first RTP packet before the switching, and a time at which the UE receives a second RTP packet after the switching. The receiving manner includes a unicast transmission manner and a multicast transmission manner. The method also includes calculating, by the GCS AS according to the time difference, a delay difference of transmitting an RTP packet in different transmission manners, and adjusting, according to the delay difference, a time at which the RTP packet is transmitted in the unicast transmission manner.

In a first possible implementation of the first aspect, the time difference between a first RTP packet and a second RTP packet is obtained by receiving a first timestamp identifier of the first RTP packet received by the UE, and receiving a second timestamp identifier of the second RTP packet received by the UE. The first timestamp identifier and the second timestamp identifier are reported by the UE. The time difference between the first RTP packet and the second RTP packet is determined according to the first timestamp identifier and the second timestamp identifier. Alternatively, the time difference is obtained by receiving the time difference that is between the first RTP packet and the second RTP packet and that is reported by the UE. In that case, the time difference is calculated by the UE according to a first timestamp identifier of the first RTP packet received by the UE, and a second timestamp identifier of the second RTP packet received by the UE.

With reference to the first aspect or the first possible implementation of the first aspect, in a second possible implementation of the first aspect, the delay difference of transmitting an RTP packet in different transmission manners is calculated according to the time difference, by selecting a maximum time difference from obtained time differences as the delay difference of transmitting the RTP packet in the different transmission manners. Alternatively, the delay difference is calculated by determining an average value of multiple obtained time differences, and using the average value as the delay difference of transmitting the RTP packet in the different transmission manners.

With reference to the first aspect to the second possible implementation of the first aspect, in a third possible implementation of the first aspect, before the time difference between a first RTP packet and a second RTP packet is obtained, the method also includes sending, by the GCS AS, a notification message to the UE to report, or that can trigger the UE to report, a measurement result. The measurement result is the first timestamp identifier of the first RTP packet received by the UE, and the second timestamp identifier of the second RTP packet received by the UE. Alternatively, the measurement result is the time difference calculated by the UE, according to the first timestamp identifier of the first RTP packet received by the UE and the second timestamp identifier of the second RTP packet received by the UE.

With reference to the first aspect to the third possible implementation of the first aspect, in a fourth possible implementation of the first aspect, the notification message is sent by using a GC1 interface signaling message, or by using a broadcast/multicast service center (BM-SC).

With reference to the first aspect to the fourth possible implementation of the first aspect, in a fifth possible implementation of the first aspect, the notification message includes a quality of experience metric. The method also includes receiving the quality of experience metric that carries the measurement result and that is reported by the UE.

With reference to the first aspect to the fifth possible implementation of the first aspect, in a sixth possible implementation of the first aspect, the quality of experience metric reported by the UE is received in one of the following manners: by using the GC1 interface signaling message, by using the Hypertext Transfer Protocol (HTP), or by using the BM-SC.

With reference to the first aspect to the sixth possible implementation of the first aspect, in a seventh possible implementation of the first aspect, the time at which the RTP packet is transmitted in the unicast transmission manner, is adjusted by delaying, according to the delay difference, the time at which the RTP packet is transmitted in the unicast transmission manner.

With reference to the first aspect to the seventh possible implementation of the first aspect, in an eighth possible implementation of the first aspect, the first RTP packet is the last RTP packet that is received by the UE on a transmission path used before RTP packet receiving path switching, and that is received before the RTP packet receiving manner of the UE is switched. The second RTP packet is the first RTP packet that is received by the UE on a transmission path used after the RTP packet receiving path switching, and that is received after the RTP packet receiving manner of the UE is switched.

A second aspect provides a group communication method that includes: when a Real-Time Transport Protocol (RTP) packet receiving manner of user equipment (UE) is switched, measuring, by the UE, a first RTP packet received before the switching, and a second RTP packet received after the switching. The receiving manner includes a unicast transmission manner and a multicast transmission manner. The method also includes reporting, by the UE, a measurement result obtained by measuring the first RTP packet and the second RTP packet.

In a first possible implementation of the second aspect, the UE measures the first RTP packet and the second RTP packet by obtaining a first timestamp identifier of the first RTP packet received before the switching, and a second timestamp identifier of the second RTP packet received after the switching. The measurement result that is reported by the UE includes the first timestamp identifier, and the second timestamp identifier.

With reference to the second aspect or the first possible implementation of the second aspect, in a second possible implementation of the second aspect, the UE measures the first RTP packet, and the second RTP packet by obtaining a first timestamp identifier of the first RTP packet, and a second timestamp identifier of the second RTP packet, and by determining a time difference according to the first timestamp identifier and the second timestamp identifier. The measurement result includes the determined time difference between the first RTP packet and the second RTP packet.

With reference to the second aspect to the second possible implementation of the second aspect, in a third possible implementation of the second aspect, before the UE measures the first RTP packet, and the second RTP packet, the method also includes receiving a notification message to the UE to report the measurement result. The measurement result is the first timestamp identifier of the first RTP packet, and the second timestamp identifier of the second RTP packet. Alternatively, the measurement result is the time difference calculated by the UE, according to the first timestamp identifier of the first RTP packet, and the second timestamp identifier of the second RTP packet.

With reference to the second aspect to the third possible implementation of the second aspect, in a fourth possible implementation of the second aspect, the notification message is received by the UE by using a GC1 interface signaling message, or by using a broadcast/multicast service center (BM-SC).

With reference to the second aspect to the fourth possible implementation of the second aspect, in a fifth possible implementation of the second aspect, the notification message includes a quality of experience metric. The method also includes reporting, by the UE, the quality of experience metric that carries the measurement result.

With reference to the second aspect to the fifth possible implementation of the second aspect, in a sixth possible implementation of the second aspect, the UE reports the quality of experience metric that carries the measurement result by using a GC1 interface signaling message, the Hypertext Transfer Protocol (HTP), or the BM-SC.

With reference to the second aspect to the sixth possible implementation of the second aspect, in a seventh possible implementation of the second aspect, the first RTP packet is the last RTP packet that is received by the UE on a transmission path used before RTP packet receiving path switching, and that is received before the RTP packet receiving manner of the UE is switched. The second RTP packet is the first RTP packet that is received by the UE on a transmission path used after the RTP packet receiving path switching, and that is received after the RTP packet receiving manner of the UE is switched.

A third aspect provides a group communication method that includes, when a Real-Time Transport Protocol (RTP) packet receiving manner of user equipment (UE) is switched, receiving an RTP packet retransmission request sent by the UE. The method also includes resending an RTP packet to the UE in a unicast transmission manner according to an RTP packet identifier in the RTP packet retransmission request.

In a first possible implementation of the third aspect, the RTP packet retransmission request is sent by the UE by using a GC1 interface signaling message, by using the Hypertext Transfer Protocol (HTTP), or by using an extended RR Real-Time Transport Control Protocol (RTCP) packet.

A fourth aspect provides a group communication method that includes, when a Real-Time Transport Protocol (RTP) packet receiving manner of user equipment (UE) is switched, sending, by the UE, an RTP packet retransmission request. The RTP packet retransmission request includes an identifier of an RTP packet requested to be retransmitted. The method also includes receiving a retransmitted RTP packet.

In a first possible implementation of the fourth aspect, before the UE sends the RTP packet retransmission request, the method also includes measuring, by the UE, a received first RTP packet and a received second RTP packet. The method also includes determining the identifier of the RTP packet requested to be retransmitted.

With reference to the fourth aspect or the first possible implementation of the fourth aspect, in a second possible implementation of the fourth aspect, the first RTP packet is the last RTP packet that is received by the UE on a transmission path used before RTP packet receiving path switching, and that is received before the RTP packet receiving manner of the UE is switched. The second RTP packet is the first RTP packet that is received by the UE on a transmission path used after the RTP packet receiving path switching, and that is received after the RTP packet receiving manner of the UE is switched.

With reference to the fourth aspect to the second possible implementation of the fourth aspect, in a third possible implementation of the fourth aspect, the UE sends the RTP packet retransmission request by using a GC1 interface signaling message, the Hypertext Transfer Protocol (HTTP), or by using an extended Real-Time Transport Control Protocol (RTCP) RR packet.

A fifth aspect provides a group communications apparatus includes an obtaining module, a calculation module, and an execution module. The obtaining module is configured to obtain a time difference between a time at which the UE receives a first Real-Time Transport Protocol (RTP) packet before the switching and a time at which a user equipment (UE) receives a second RTP packet after the switching, when the RTP packet receiving manner of the UE is switched. The obtaining module is also configured to transmit the time difference to the calculation module. The receiving manner includes a unicast transmission manner and a multicast transmission manner. The calculation module is configured to calculate, according to the time difference transmitted by the obtaining module, a delay difference of transmitting an RTP packet in different transmission manners. The calculation module is also configured to transmit the delay difference to the execution module. The execution module is configured to adjust, according to the delay difference transmitted by the calculation module, a time at which the RTP packet is transmitted in the unicast transmission manner.

In a first possible implementation of the fifth aspect, the obtaining module is configured to obtain the time difference by being configured to receive a first timestamp identifier of the first RTP packet received by the UE, and a second timestamp identifier of the second RTP packet received by the UE, and determine the time difference between the first RTP packet and the second RTP packet, according to the received first timestamp identifier and second timestamp identifier. The first timestamp identifier and the second timestamp identifier are reported by the UE. Alternatively, the obtaining module is configured to obtain the time difference by being configured to receive the time difference that is between the first RTP packet and the second RTP packet and that is reported by the UE. In that case, the UE calculates the time difference, according to a first timestamp identifier of the first RTP packet received by the UE and a second timestamp identifier of the second RTP packet received by the UE.

With reference to the fifth aspect or the first possible implementation of the fifth aspect, in a second possible implementation of the fifth aspect, the calculation module is configured to calculate the delay difference by being configured to select a maximum time difference from obtained time differences as the delay difference of transmitting the RTP packet in the different transmission manners. Alternatively, the calculation module is configured to calculate the delay difference by being configured to determine an average value of multiple obtained time differences, and use the average value as the delay difference of transmitting the RTP packet in the different transmission manners.

With reference to the fifth aspect to the second possible implementation of the fifth aspect, in a third possible implementation of the fifth aspect, the apparatus also includes a sending module. The sending module is configured to send a notification message to trigger the UE to report a measurement result. The measurement result is the first timestamp identifier of the first RTP packet received by the UE and the second timestamp identifier of the second RTP packet received by the UE. Alternatively, the measurement result is the time difference calculated by the UE, according to the first timestamp identifier of the first RTP packet, and the second timestamp identifier of the second RTP packet.

With reference to the fifth aspect to the third possible implementation of the fifth aspect, in a fourth possible implementation of the fifth aspect, the sending module is configured to send the notification message by using a GC1 interface signaling message, or by using a broadcast/multicast service center (BM-SC).

With reference to the fifth aspect to the fourth possible implementation of the fifth aspect, in a fifth possible implementation of the fifth aspect, the notification message sent by the sending module includes a quality of experience metric. The apparatus also includes a receiving module that is configured to receive the quality of experience metric that carries the measurement result and that is reported by the UE.

With reference to the fifth aspect to the fifth possible implementation of the fifth aspect, in a sixth possible implementation of the fifth aspect, the receiving module is configured to receive the quality of experience metric reported by the UE by using the GC1 interface signaling message, the Hypertext Transfer Protocol (HTTP), or the BM-SC.

With reference to the fifth aspect to the sixth possible implementation of the fifth aspect, in a seventh possible implementation of the fifth aspect, the execution module is configured to delay, according to the delay difference, the time at which the RTP packet is transmitted in the unicast transmission manner.

With reference to the fifth aspect to the seventh possible implementation of the fifth aspect, in an eighth possible implementation of the fifth aspect, the time difference that is obtained is a difference between the time at which the UE receives the first RTP packet before the switching, and the time at which the UE receives the second RTP packet after the switching. The first RTP packet is the last RTP packet that is received by the UE on a transmission path used before RTP packet receiving path switching, and that is received before the RTP packet receiving manner of the UE is switched. The second RTP packet is the first RTP packet that is received by the UE on a transmission path used after the RTP packet receiving path switching and that is received after the RTP packet receiving manner of the UE is switched.

A sixth aspect provides a group communications apparatus includes a measurement module and an execution module. The measurement module is configured, when a Real-Time Transport Protocol RTP packet receiving manner of user equipment UE is switched, to measure a first RTP packet received before the switching, and a second RTP packet received after the switching. The receiving manner includes a unicast transmission manner and a multicast transmission manner. The execution module is configured to report a measurement result obtained by measuring the first RTP packet and the second RTP packet.

In a first possible implementation of the sixth aspect, the measurement module is configured to measure the first RTP packet and the second RTP packet, by being configured to obtain a first timestamp identifier of the first RTP packet received before the switching, and a second timestamp identifier of the second RTP packet received after the switching. The execution module is configured to use the first timestamp identifier and the second timestamp identifier, as the measurement result, and report the measurement result.

With reference to the sixth aspect or the first possible implementation of the sixth aspect, in a second possible implementation of the sixth aspect, the measurement module is configured to obtain the first timestamp identifier of the first RTP packet, and the second timestamp identifier of the second RTP packet, and determine a time difference according to the first timestamp identifier and the second timestamp identifier, The execution module is configured to: use, as the measurement result, the determined time difference between the first RTP packet and the second RTP packet, and report the measurement result.

With reference to the sixth aspect to the second possible implementation of the sixth aspect, in a third possible implementation of the sixth aspect, the apparatus also includes a receiving module. The receiving module is configured to receive a notification message used to trigger the UE to report the measurement result. The measurement result is the first timestamp identifier of the received first RTP packet and the second timestamp identifier of the received second RTP packet. Alternatively, the measurement result is the time difference calculated according to the first timestamp identifier of the received first RTP packet and the second timestamp identifier of the received second RTP packet.

With reference to the sixth aspect to the third possible implementation of the sixth aspect, in a fourth possible implementation of the sixth aspect, the receiving module is configured to receive the notification message by using a GC1 interface signaling message, or a broadcast/multicast service center (BM-SC).

With reference to the sixth aspect to the fourth possible implementation of the sixth aspect, in a fifth possible implementation of the sixth aspect, the notification message includes a quality of experience metric, and the execution module is configured to report the quality of experience metric that carries the measurement result.

With reference to the sixth aspect to the fifth possible implementation of the sixth aspect, in a sixth possible implementation of the sixth aspect, the execution module is configured to report the quality of experience metric that carries the measurement result by using a GC1 interface signaling message, by using the Hypertext Transfer Protocol (HTTP), or by using the BM-SC.

With reference to the sixth aspect to the sixth possible implementation of the sixth aspect, in a seventh possible implementation of the sixth aspect, the first RTP packet measured by the measurement module is the last RTP packet that is received on a transmission path used before RTP packet receiving path switching and that is received before the RTP packet receiving manner is switched. The second RTP packet measured by the measurement module is the first RTP packet that is received on a transmission path used after the RTP packet receiving path switching and that is received after the RTP packet receiving manner is switched.

A seventh aspect provides a group communications apparatus that includes a receiving module and an execution module. The receiving module is configured, when a Real-Time Transport Protocol (RTP) packet receiving manner of user equipment (UE) is switched, to receive an RTP packet retransmission request sent by the UE. The execution module is configured to resend an RTP packet to the UE in a unicast transmission manner, according to an RTP packet identifier in the RTP packet retransmission request.

In a first possible implementation of the seventh aspect, the receiving module is configured to receive, the RTP packet retransmission request sent by the UE, by using a GC1 interface signaling message, by using the Hypertext Transfer Protocol (HTTP), or by using an extended RR Real-Time Transport Control Protocol (RTCP) packet.

An eighth aspect provides a group communications apparatus that includes a sending module; and a receiving module. The sending module is configured, when a Real-Time Transport Protocol (RTP) packet receiving manner is switched, send an RTP packet retransmission request. The RTP packet retransmission request includes an identifier of an RTP packet requested to be retransmitted. The receiving module is configured to receive a retransmitted RTP packet.

In a first possible implementation of the eighth aspect, the apparatus also includes a measurement module. The measurement module is configured to measure a received first RTP packet, and a received second RTP packet. The measurement module is also configured to determine the identifier of the RTP packet requested to be retransmitted.

With reference to the eighth aspect or the first possible implementation of the eighth aspect, in a second possible implementation of the eighth aspect, the first RTP packet, which is measured by the measurement module, is the last RTP packet that is received by the UE on a transmission path used before RTP packet receiving path switching and that is received before the RTP packet receiving manner of the UE is switched. The second RTP packet, which is measured by the measurement module, is the first RTP packet that is received by the UE on a transmission path used after the RTP packet receiving path switching and that is received after the RTP packet receiving manner of the UE is switched.

With reference to the eighth aspect to the second possible implementation of the eighth aspect, in a third possible implementation of the eighth aspect, the sending module is configured to send the RTP packet retransmission request by using a GC1 interface signaling message, by using the Hypertext Transfer Protocol (HITP), or by using an extended RR Real-Time Transport Control Protocol (RTCP) packet.

A ninth aspect provides a group communications device that includes: a non-transitory memory that is configured to store a program instruction; and a non-transitory signal processor that is configured to obtain the program instruction stored in the non-transitory memory, and cause the group communications device to perform the following according to the program instruction. When a Real-Time Transport Protocol (RTP) packet receiving manner of user equipment (UE) is switched, the group communications device obtains a time difference between a time at which the UE receives a first RTP packet before the switching and a time at which the UE receives a second RTP packet after the switching. The receiving manner includes a unicast transmission manner and a multicast transmission manner. The group communications device calculates, according to the time difference, a delay difference of transmitting an RTP packet in different transmission manners. The group communications device transmits the delay difference to an execution module. The group communications device adjusts, according to the delay difference, a time at which the RTP packet is transmitted in the unicast transmission manner.

In a first possible implementation of the ninth aspect, the signal processor is also configured to receive a first timestamp identifier of the first RTP packet received by the UE, and a second timestamp identifier of the second RTP packet received by the UE, where the first timestamp identifier and the second timestamp identifier are reported by the UE, and determine the time difference between the first RTP packet and the second RTP packet, according to the first timestamp identifier and the second timestamp identifier. Alternatively to determining the time difference, the signal processor is configured to receive the time difference that is between the first RTP packet and the second RTP packet and that is reported by the UE. In that case, the time difference is calculated by the UE according to a first timestamp identifier of the first RTP packet received by the UE, and a second timestamp identifier of the second RTP packet received by the UE.

With reference to the ninth aspect or the first possible implementation of the ninth aspect, in a second possible implementation of the ninth aspect, the signal processor is configured to select a maximum time difference from obtained time differences as the delay difference of transmitting the RTP packet in the different transmission manners, or determine an average value of multiple obtained time differences, and use the average value as the delay difference of transmitting the RTP packet in the different transmission manners.

With reference to the ninth aspect to the second possible implementation of the ninth aspect, in a third possible implementation of the ninth aspect, the group communications device also includes an interface. The interface is configured to send a notification message used to trigger the UE to report a measurement result, where the measurement result is the first timestamp identifier of the first RTP packet received by the UE and the second timestamp identifier of the second RTP packet received by the UE, or is the time difference calculated by the UE according to the first timestamp identifier of the first RTP packet received by the UE and the second timestamp identifier of the second RTP packet received by the UE.

With reference to the ninth aspect to the third possible implementation of the ninth aspect, in a fourth possible implementation of the ninth aspect, the interface is configured to send the notification message by using a GC1 interface signaling message, or by using a broadcast/multicast service center (BM-SC).

With reference to the ninth aspect to the fourth possible implementation of the ninth aspect, in a fifth possible implementation of the ninth aspect, the notification message sent by the interface includes a quality of experience metric, and the interface is configured to receive the quality of experience metric that carries the measurement result and that is reported by the UE.

With reference to the ninth aspect to the fifth possible implementation of the ninth aspect, in a sixth possible implementation of the ninth aspect, the interface is configured to receive the quality of experience metric reported by the UE by the UE by using the GC1 interface signaling message, by using the Hypertext Transfer Protocol (HITP). or by using the BM-SC.

With reference to the ninth aspect to the sixth possible implementation of the ninth aspect, in a seventh possible implementation of the ninth aspect, the signal processor is configured to delay, according to the delay difference, the time at which the RTP packet is transmitted in the unicast transmission manner.

With reference to the ninth aspect to the seventh possible implementation of the ninth aspect, in an eighth possible implementation of the ninth aspect, in the time difference that is obtained by the signal processor and that is between the time at which the UE receives the first RTP packet before the switching and the time at which the UE receives the second RTP packet after the switching, the first RTP packet is the last RTP packet that is received by the UE on a transmission path used before RTP packet receiving path switching and that is received before the RTP packet receiving manner of the UE is switched. The second RTP packet is the first RTP packet that is received by the UE on a transmission path used after the RTP packet receiving path switching and that is received after the RTP packet receiving manner of the UE is switched.

A tenth aspect provides a group communications device includes a non-transitory memory configured to store a program instruction, a non-transitory signal processor configured to obtain the program instruction stored in the memory; and an interface. The signal processor causes the group communications device to perform the following, according to the program instruction. When a Real-Time Transport Protocol (RTP) packet receiving manner of user equipment (UE) is switched, the group communication device measures a first RTP packet received before the switching and a second RTP packet received after the switching, where the receiving manner includes a unicast transmission manner and a multicast transmission manner. The interface is configured to report a measurement result obtained by measuring the first RTP packet and the second RTP packet.

In a first possible implementation of the tenth aspect, the signal processor is configured to obtain a first timestamp identifier of the first RTP packet received before the switching and a second timestamp identifier of the second RTP packet received after the switching. The interface is configured to use the first timestamp identifier and the second timestamp identifier as the measurement result, and report the measurement result.

With reference to the tenth aspect or the first possible implementation of the tenth aspect, in a second possible implementation of the tenth aspect, the signal processor is configured to obtain a first timestamp identifier of the first RTP packet received before the switching and a second timestamp identifier of the second RTP packet received after the switching, and determine a time difference according to the first timestamp identifier and the second timestamp identifier. The interface is configured to use the determined time difference between the first RTP packet and the second RTP packet as the measurement result, and report the measurement result.

With reference to the tenth aspect to the second possible implementation of the tenth aspect, in a third possible implementation of the tenth aspect, the interface is also configured to receive a notification message used to trigger the UE to report the measurement result, where the measurement result is the first timestamp identifier of the received first RTP packet and the second timestamp identifier of the received second RTP packet, or is the time difference calculated according to the first timestamp identifier of the received first RTP packet and the second timestamp identifier of the received second RTP packet.

With reference to the tenth aspect to the third possible implementation of the tenth aspect, in a fourth possible implementation of the tenth aspect, the interface is configured to receive the notification message in the following manner: receiving the notification message by using a GC1 interface signaling message; or receiving the notification message by using a broadcast/multicast service center BM-SC.

With reference to the tenth aspect to the fourth possible implementation of the tenth aspect, in a fifth possible implementation of the tenth aspect, the notification message includes a quality of experience metric, and the interface is configured to report the quality of experience metric that carries the measurement result.

With reference to the tenth aspect to the fifth possible implementation of the tenth aspect, in a sixth possible implementation of the tenth aspect, the interface is configured to report, in one of the following manners, the quality of experience metric that carries the measurement result: reporting, by using a GC1 interface signaling message, the quality of experience metric that carries the measurement result; reporting, by using the Hypertext Transfer Protocol (HTTP), the quality of experience metric that carries the measurement result; or reporting, by using the BM-SC, the quality of experience metric that carries the measurement result.

With reference to the tenth aspect to the sixth possible implementation of the tenth aspect, in a seventh possible implementation of the tenth aspect, the first RTP packet measured by the signal processor is the last RTP packet that is received on a transmission path used before RTP packet receiving path switching and that is received before the RTP packet receiving manner is switched. The second RTP packet measured by the signal processor is the first RTP packet that is received on a transmission path used after the RTP packet receiving path switching and that is received after the RTP packet receiving manner is switched.

An eleventh aspect provides a group communications device that includes an interface; a non-transitory memory, and a non-transitory signal processor. The interface is, configured, when a Real-Time Transport Protocol (RTP) packet receiving manner of user equipment (UE) is switched, receive an RTP packet retransmission request sent by the UE. The non-transitory memory is configured to store a program instruction. The non-transitory signal processor is configured to obtain the program instruction stored in the memory, and cause the group communications device to resend an RTP packet to the UE in a unicast transmission manner, according to an RTP packet identifier in the RTP packet retransmission request.

In a first possible implementation of the eleventh aspect, the interface is configured to receive, in one of the following manners, the RTP packet retransmission request sent by the UE: receiving the RTP packet retransmission request that is sent by the UE by using a GC1 interface signaling message, receiving the RTP packet retransmission request that is sent by the UE by using the Hypertext Transfer Protocol (HTTP), or receiving the RTP packet retransmission request that is sent by the UE by using an extended RR Real-Time Transport Control Protocol (RTCP) packet.

A twelfth aspect provides a group communications device includes a non-transitory memory configured to store a program instruction, and a non-transitory signal processor configured to obtain the program instruction stored in the memory, and perform the following steps according to the program instruction. When a Real-Time Transport Protocol (RTP) packet receiving manner is switched, the signal processor sends an RTP packet retransmission request by using an interface, where the RTP packet retransmission request includes an identifier of an RTP packet requested to be retransmitted. The signal processor receives a retransmitted RTP packet by using the interface.

In a first possible implementation of the twelfth aspect, the signal processor is also configured to measure a received first RTP packet and a received second RTP packet, and determine the identifier of the RTP packet requested to be retransmitted.

With reference to the twelfth aspect or the first possible implementation of the twelfth aspect, in a second possible implementation of the twelfth aspect, the first RTP packet measured by the signal processor is the last RTP packet that is received by the UE on a transmission path used before RTP packet receiving path switching and that is received before the RTP packet receiving manner of the UE is switched, and the second RTP packet measured by the signal processor is the first RTP packet that is received by the UE on a transmission path used after the RTP packet receiving path switching and that is received after the RTP packet receiving manner of the UE is switched.

With reference to the twelfth aspect to the second possible implementation of the twelfth aspect, in a third possible implementation of the twelfth aspect, the signal processor is configured to send the RTP packet retransmission request by using the interface in one of the following manners: sending the RTP packet retransmission request by using a GC1 interface signaling message, sending the RTP packet retransmission request by using the Hypertext Transfer Protocol (HITP), or sending the RTP packet retransmission request by using an extended RR Real-Time Transport Control Protocol (RTCP) packet.

By using the foregoing first technical solution, when the Real-Time Transport Protocol (RTP) packet receiving manner of the UE is switched, the GCS AS obtains the time difference between the time at which the UE receives the first RTP packet before the switching and the time at which the UE receives the second RTP packet after the switching. The GCS AS calculates, according to the time difference, the delay difference of transmitting the RTP packet in the different transmission manners. The GCS AS adjusts, according to the delay difference, the time at which the RTP packet is transmitted in the unicast transmission manner. On a UE side, the UE measures the first RTP packet received before the switching and the second RTP packet received after the switching, and the UE reports the measurement result obtained by measuring the first RTP packet and the second RTP packet. Therefore, the following problem can be better resolved: Because the unicast manner is different from the multicast manner in terms of an RTP packet transmission delay, RTP packets received by the UE on different data transmission paths that are used before and after the switching are out of order and out of synchronization (for example, a packet may be lost or repeatedly received).

By using the foregoing second technical solution, when the RTP packet receiving manner of the UE is switched, the RTP packet retransmission request sent by the UE is received, and the RTP packet is resent to the UE in the unicast transmission manner according to the RTP packet identifier in the RTP packet retransmission request. Therefore, the following problem can be better resolved: Because the unicast manner is different from the multicast manner in terms of an RTP packet transmission delay, RTP packets received by the UE on different data transmission paths that are used before and after the switching are out of order and out of synchronization (for example, a packet may be lost or repeatedly received).

BRIEF DESCRIPTION OF THE DRAWINGS

To describe the technical solutions in the embodiments of this application more clearly, the following briefly describes the accompanying drawings required for describing the embodiments.

DETAILED DESCRIPTION OF ILLUSTRATIVE EMBODIMENTS

Main implementation principles and specific implementations of the technical solutions in the embodiments of the present application, and corresponding advantageous effects that can be achieved thereby are hereinafter described in detail with reference to the accompanying drawings.

Embodiment 1

Figure 1:
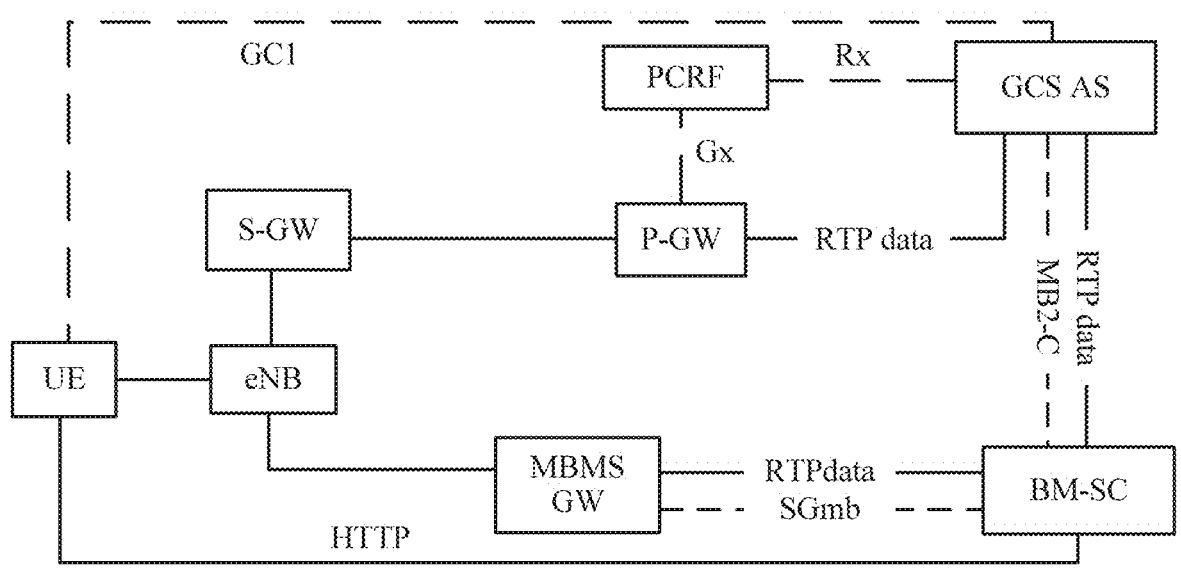
FIG. 1 is a schematic diagram of structural composition of a user plane in group communication.
Figure 2:
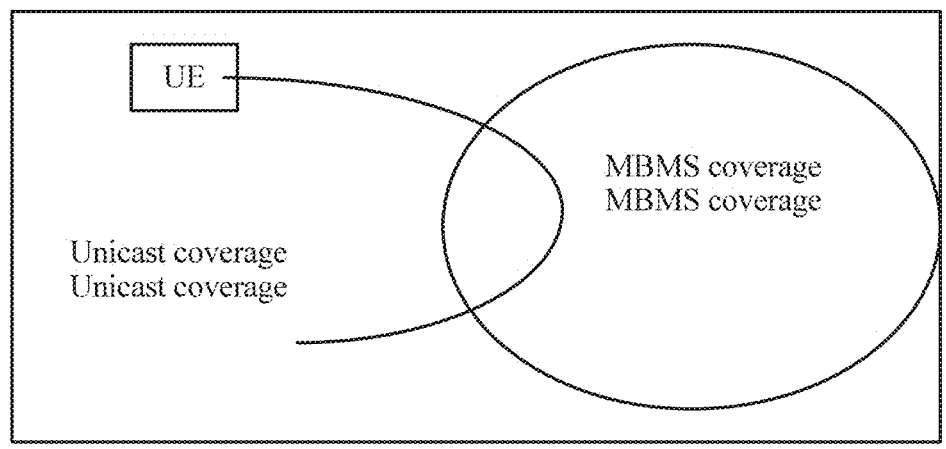
FIG. 2 is a schematic diagram of switching an RTP packet receiving manner in a moving process of UE.
Figure 3:
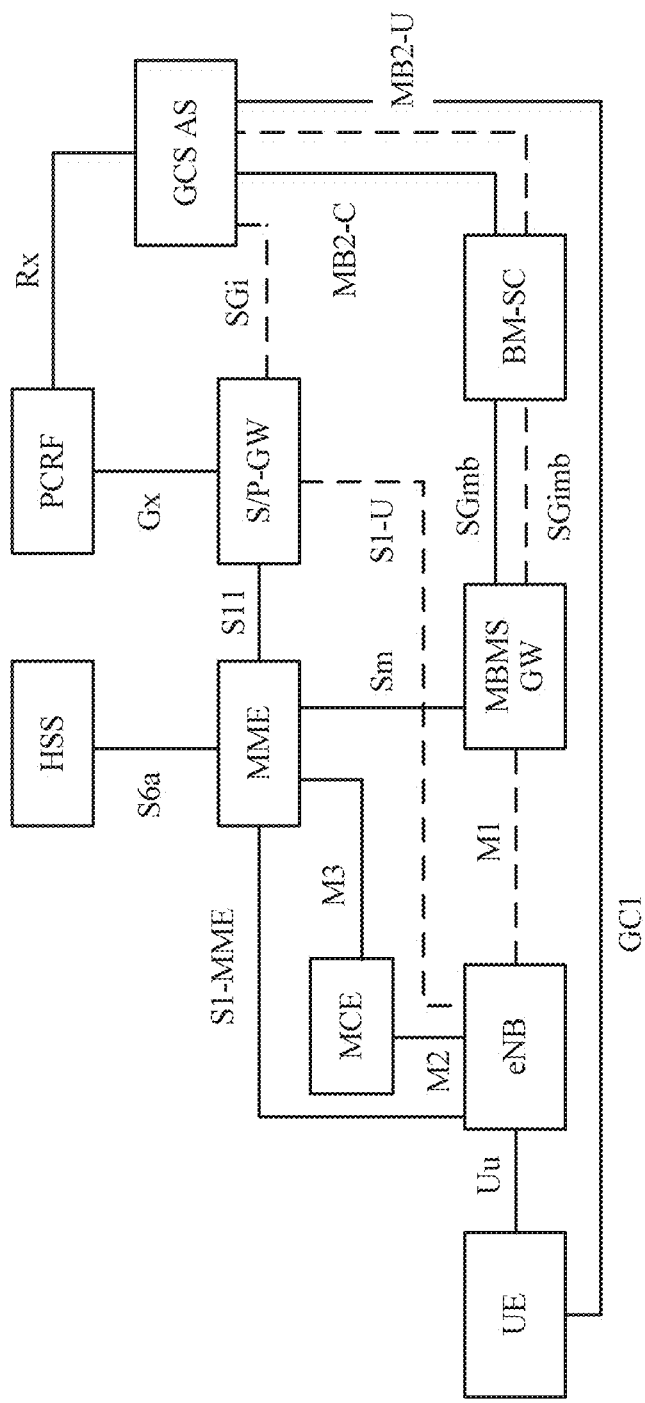
FIG. 3 is a schematic diagram of architectural composition of an LTE group communications system.

Embodiment 1 provides, according to some embodiments of the present application, a group communications system. In an LTE group communications system architecture shown in FIG. 3, a connection relationship between network element devices is shown in FIG. 3. A BM-SC is a network element at a service layer and an ingress for a content provider, and provides service convergence and sending, UE authorization, MBMS session management, and the like. In addition, the BM-SC can further be synchronized with an E-UTRAN. An MBMS GW is a node between the BM-SC and the E-UTRAN, is an access gateway in the system, and is configured to process a packet related to UE data and signaling related to session management. A multi-cell/multicast coordination entity (MCE) is configured to: schedule and manage a radio resource, that is, select a suitable resource (including parameters such as frequency and time) to perform multimedia multicast broadcast service single frequency network transmission, so that the resource can be used properly and efficiently. A GCS AS is a third-party application server, and is mainly responsible for functions such as group member management and MBMS bearer activation initiation. An HSS is configured to store UE subscription information in a home network. A PCRF is used to implement a QoS (quality of service) policy control function and a charging control function, and further provides an authorization control function that is based on the UE subscription information. A mobility management entity (MME) is configured to implement functions such as MBMS session management participation. An eNB is configured to implement functions such as MBMS user data broadcasting. An S-GW/P-GW mainly implements functions such as MBMS session management participation and MBMS user data delivery.

Figure 4:
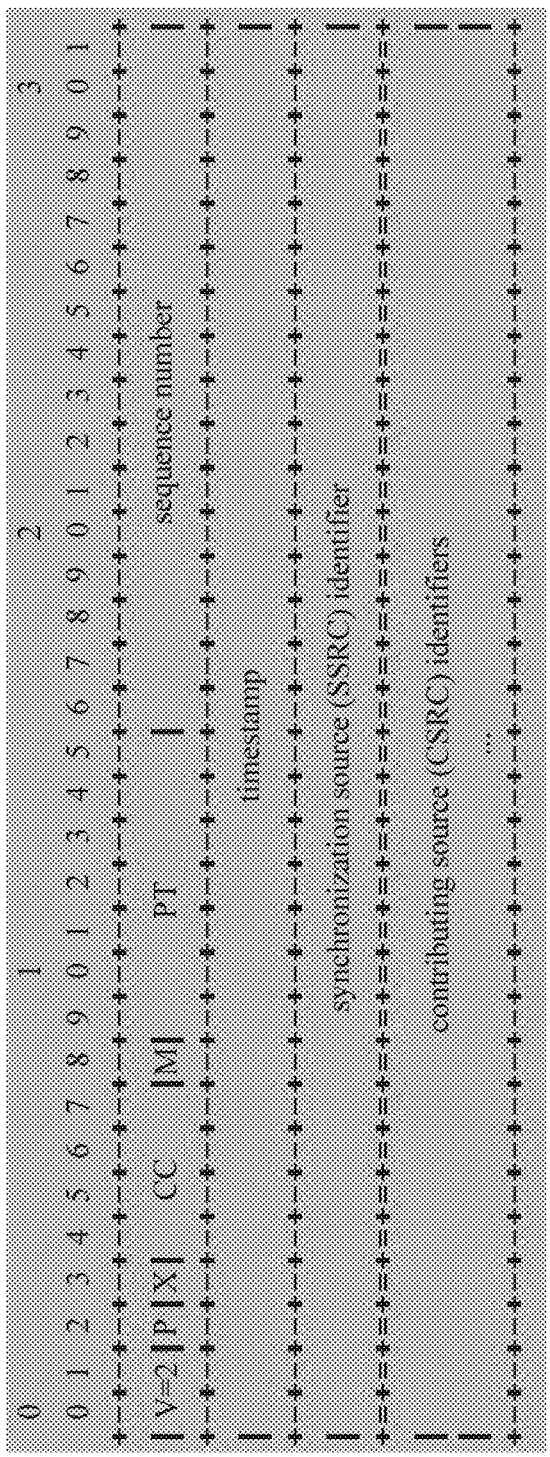
FIG. 4 is a schematic diagram of structural composition of an RTP packet.

In the group communications system, data is transmitted based on the RTP. For a packet header format of an RTP packet transmitted in the system, refer to FIG. 4. In an RTP packet, a sequence number (SN) is a sequence number of each RTP packet. After receiving an RTP packet, a receiver may detect, according to an SN, whether an RTP packet is lost or RTP packets are recombined. A timestamp (Timestamp) is a timestamp identifier of an RTP packet, and is used to identify a sending time or an arrival time of the RTP packet. A synchronization source (SSRC) identifier is a synchronization data source identifier, and is used to identify a synchronization data source. A contributing source (CSRC) identifier is a contributing source identifier, and is used to identify a contributing source of valid content in an RTP packet.

Figure 5:
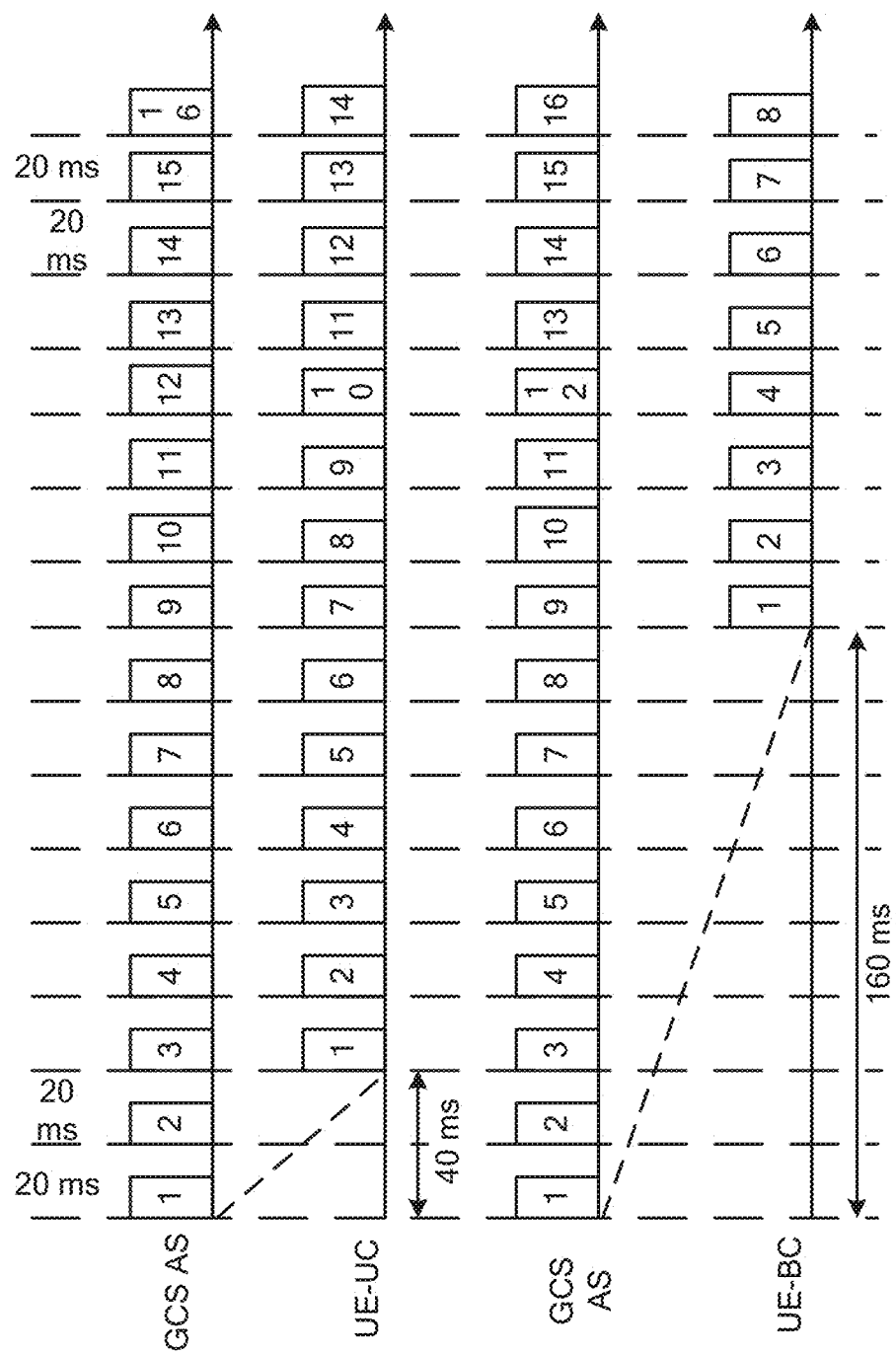
FIG. 5 is a diagram of a time sequence in which a GCS AS sends an RTP packet.

In the group communications system, RTP packet transmission manners may include a unicast (UC) transmission manner and a multicast (MC) transmission manner. As shown in FIG. 5, due to a transmission delay difference between MC and UC, an RTP packet received by UE on a unicast path is ahead of an RTP packet received on a multicast path. For example, when UE 1 starts to receive an RTP packet with SN=1 on an MC path, UE 2 has started to receive an RTP packet with SN=7 on a UC path. Due to such a transmission delay difference, in a process in which UE is switched between MC and UC, RTP packets received by the same UE on different paths that are used before and after path switching are out of order. For example, when the UE is switched from MC to UC, the UE loses some RTP packets; when the UE is switched from UC to MC, the UE repeatedly receives some RTP packets. An instance is used below to provide detailed descriptions.

Case 1: UE is switched from an MC transmission manner to a UC transmission manner, to receive an RTP packet.

Figure 6A:
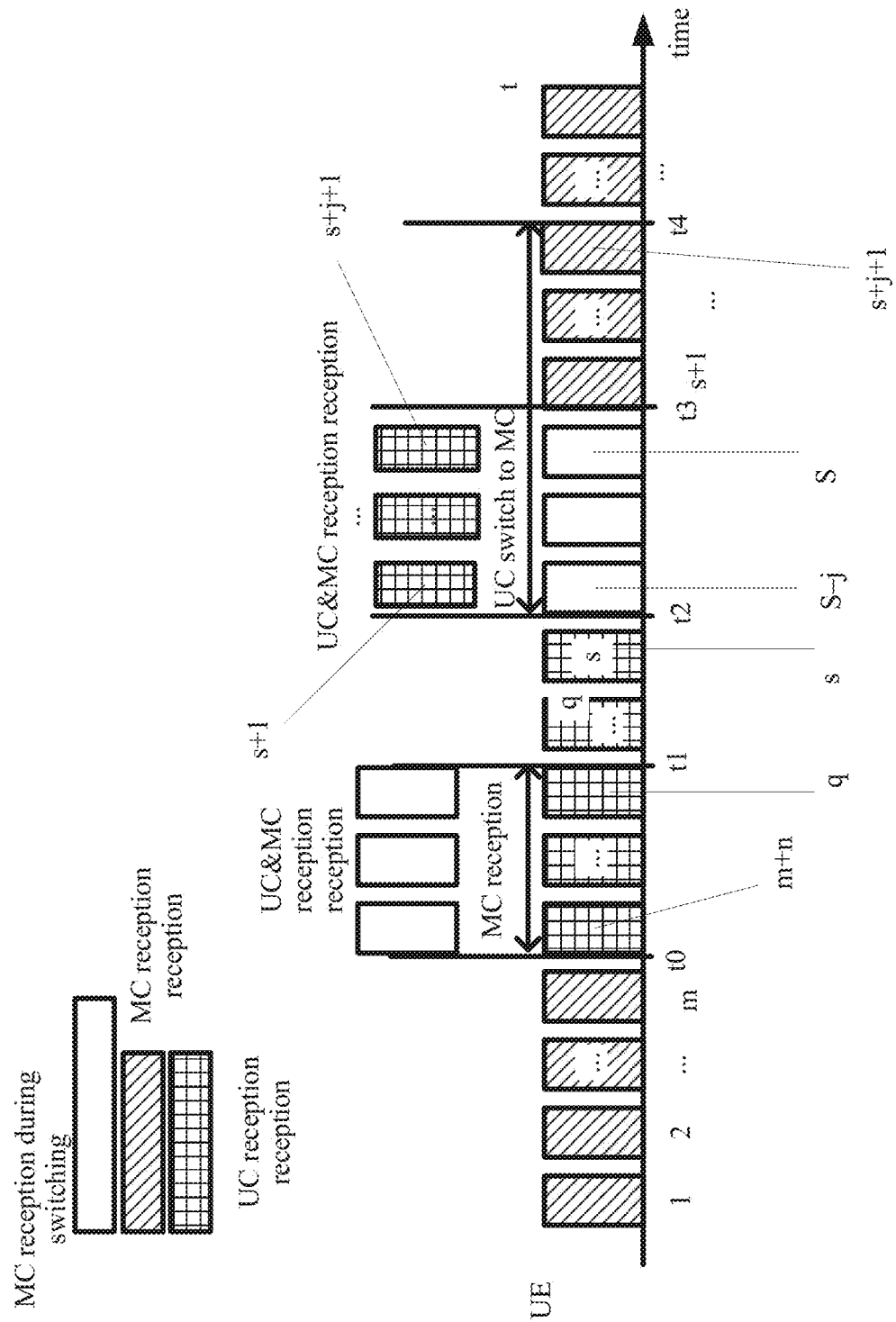
FIG. 6a is a schematic diagram of transmitting an RTP packet in different transmission manners due to a transmission delay difference.

As shown in FIG. 6a, before a moment to, the UE receives RTP packets SN1 to SNm on an MC path. It is assumed that an RTP packet transmission manner is switched at the moment to.

The UE is switched from the MC transmission manner to the UC transmission manner in two switching manners to receive the RTP packet. Detailed descriptions are separately provided below.

Switching Manner 1: Make Before Break.

"Make before break" means that the UE makes the unicast transmission manner before breaking the multicast transmission manner. In this manner, in a process of switching an RTP packet receiving path of the UE, the UE may concurrently receive RTP packets on the MC path and a UC path.

In this manner, in the switching process from t0 to t1, the UE can still continue to receive RTP packets SNm+1 to SNp−1 on the MC transmission path, and simultaneously, the UE starts to receive RTP packets SNm+n to SNq on the UC transmission path. Due to a transmission delay difference (as shown in FIG. 5) between the MC path and the UC path, the UE cannot receive RTP packets SNp to SNm+n−1 in the switching process from t0 to t1. Therefore, an RTP packet may be lost in this process.

Switching Manner 2: "break before make." The UE first breaks the multicast transmission path, and then makes the unicast transmission path.

In this manner, after the UE breaks the multicast path, a service is interrupted, and the UE can continue to receive an RTP packet on the unicast path only after the unicast path is made.

In this manner, when the switching is performed at the moment to, the MC transmission path is broken, and the UE cannot continue to receive an RTP packet on the MC transmission path. The UE can start to receive RTP packets from SNm+n on the UC transmission path according to an RTP packet sequence on the UC transmission path only after an RTP packet receiving path is switched, but the UE cannot receive RTP packets SNm+1 to SNm+n−1. Therefore, an RTP packet may be lost in a switching process of this manner.

It can be learned from the foregoing description that, an RTP packet is lost regardless of whether the switching manner is "make before break" or "break before make" when the RTP packet receiving manner of the UE is switched from MC to UC.

Case 2: As shown in FIG. 6a, UE receives RTP packets SNm+n to SNs on a UC transmission path from t0 to t2. If switching is performed at the moment t2, in a switching process from t2 to t3, the UE can simultaneously receive RTP packets on the UC transmission path and an MC transmission path. Therefore, after the switching is completed at t3, the UE receives, on the MC transmission path, some RTP packets that have been received on the UC transmission path, that is, all RTP packets received in a period from t3 to t4 are repeated, and sequence numbers of the repeated RTP packets are SNs+1 to SNs+j+1. That is, the UE repeatedly receives some RTP packets in a process of switching from unicast to multicast.

To resolve the foregoing problem, Embodiment 1 provides a technical solution. In the group communications system shown in FIG. 3, UE receives an RTP packet in an MC transmission manner or a UC transmission manner. An RTP packet receiving manner of the UE may be switched.

When the RTP packet receiving manner of the UE is switched, a GCS AS obtains a time difference between a time at which the UE receives a first RTP packet before the switching and a time at which the UE receives a second RTP packet after the switching; calculates, according to the time difference, a delay difference of transmitting an RTP packet in different transmission manners; and adjusts, according to the delay difference, a time at which the RTP packet is transmitted in the unicast transmission manner.

The GCS AS may send, to the UE, a notification message used to trigger the UE to report a measurement result obtained by measuring the first RTP packet and the second RTP packet.

The measurement result obtained by the UE by measuring the first RTP packet and the second RTP packet may be carried by using a quality of experience metric (QoE metric).

The UE receives the notification message used to trigger the UE to report the quality of experience metric, and reports the measurement result after obtaining the QoE metric. The measurement result is a first timestamp identifier of the first RTP packet received by the UE and a second timestamp identifier of the second RTP packet received by the UE, or is the time difference calculated by the UE according to a first timestamp identifier of the received first RTP packet and a second timestamp identifier of the second RTP packet received by the UE.

The QoE metric is used for configuring and storing a measurement result obtained by the UE by measuring an RTP packet. For parameter setting of the QoE metric, refer to the following Table 1.

TABLE 1

| Parameter | Value | Description |
| --- | --- | --- |
| Event | Switching (0: UC to MC, 1: MC to UC, make before break, 2: MC to UC, break before make) | Switching case |
| RTP Info over UC | Timestamp; SN | Timestamp value of RTP received over UC; SN value of RTP received over UC |
| RTP Info over MC | Timestamp; SN | Timestamp value of RTP received over MC; SN value of RTP received over MC |

In the foregoing Table 1, the UE fills in a "value" according to the received QoE metric and a switching case.

In an example implementation, in the technical solution provided in Embodiment 1, the parameter setting of the QoE metric is as follows. A case in which the UE is switched from UC to MC is identified by 0, a case in which the UE is switched from MC to UC and a switching manner is "make before break" is identified by 1, and a case in which the UE is switched from MC to UC and a switching manner is "break before make" is identified by 2. The UE needs to fill, in the QoE metric received by the UE, an SN and a timestamp identifier that are of the last RTP packet received before the RTP packet receiving manner is switched and an SN and a timestamp identifier that are of the first RTP packet received after the RTP packet receiving manner is switched.

For ease of description, in the technical solution provided in Embodiment 1, the last RTP packet received by the UE before the receiving manner is switched and the first RTP packet received by the UE after the receiving manner is switched are distinguished. The first RTP packet is the last RTP packet that is received by the UE on a transmission path used before RTP packet receiving path switching and that is received before the receiving manner is switched, and the second RTP packet is the first RTP packet that is received by the UE on a transmission path used after the RTP packet receiving path switching and that is received after the receiving manner is switched.

The GCS AS may send, in the following manners, the notification message that includes the QoE metric.

Manner 1: The GCS AS sends the notification message by using a GC1 interface signaling message.

The GCS AS determines configuration information of the quality of experience metric used to carry the measurement result, and sends, by using the GC1 interface signaling message, the notification message that includes the configuration information of the quality of experience metric.

In this manner, the GCS AS configures the QoE metric by using an application layer message.

Alternatively, the GCS AS may configure the QoE metric in the following different manners.

A: The GCS AS configures the QoE metric by using a GC1 interface signaling message such as a SIP message.

B: The GCS AS configures the QoE metric by extending SDP parameter description of a GC1 interface.

In this manner, an SDP parameter attribute may be added, to configure the QoE metric.

Correspondingly, the UE reports, in one of the following manners, the QoE metric that carries the measurement result.

A: The UE receives the notification message from the GCS AS, and obtains the QoE metric from the notification message. The UE configures the QoE metric according to RTP packet detection results obtained before and after the RTP packet receiving manner is switched. The UE reports the configured QoE metric to the GCS AS by using a GC1 interface signaling message such as a SIP message.

B: The UE receives the notification message from the GCS AS, and obtains the QoE metric from the notification message. The UE configures the QoE metric according to RTP packet detection results obtained before and after the RTP packet receiving manner is switched. The UE reports the configured QoE metric to the GCS AS by using the Hypertext Transfer Protocol (HTTP).

Manner 2: The GCS AS sends the notification message by using a broadcast/multicast service center BM-SC.

In this manner, delivery and reporting of the QoE metric are completed between the GCS AS and the UE according to 3GPP stipulations.

The GCS AS is configured to send an MBMS bearer activation request message to the BM-SC.

The GCS AS includes a QoE metric requested indicator to the request message. The parameter is used to instruct the BM-SC to configure the QoE metric.

The BM-SC is configured to: receive the request message sent by the GCS AS; and when receiving the request message, allocate an MBMS resource and initiate a session establishment procedure. When creating user service description (USD), the BM-SC adds the QoE metric to associated delivery procedure (ADP) metadata.

The UE obtains the USD from the BM-SC.

The USD obtained by the UE includes the QoE metric, the UE obtains the USD from the BM-SC, and the UE fills in a QoE metric parameter matrix (a value) according to the QoE metric in the obtained USD and RTP packet detection results. The UE reports the QoE metric to the BM-SC according to a QoE metric reporting procedure.

The BM-SC replies to the GCS AS with a response message for an MBMS bearer activation request, the BM-SC receives the QoE metric reported by the UE, and forwards, to the GCS AS, the QoE metric reported by the UE.

The BM-SC may forward, to the GCS AS in the following two manners, the QoE metric reported by the UE.

A: The QoE metric reported by the UE is forwarded to the GCS AS by using a transmission status indication message.

In this manner, the QoE metric reported by the UE is added to the indication message.

B: The QoE metric reported by the UE is forwarded to the GCS AS by extending a message header of a Real-Time Transport Control Protocol (RTCP) receive report (RR).

Figure 6B:
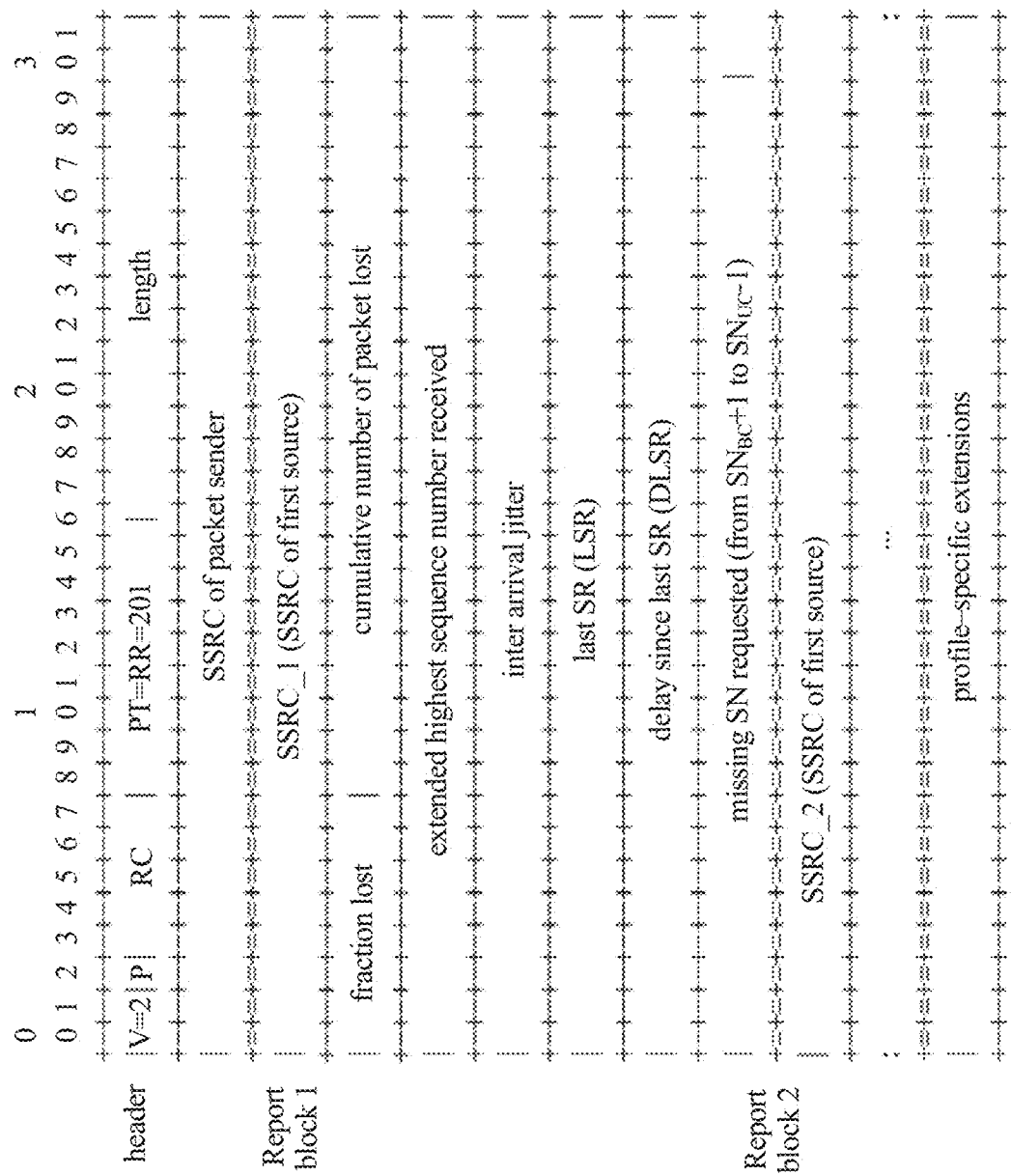
FIG. 6b is a schematic structural diagram of an extended RTCP RR.

As shown in FIG. 6b, a field used to describe the QoE metric is added to the message header of the RTCP RR.

The GCS AS is configured to obtain, according to the QoE metric reported by the UE, the time difference between the time at which the UE receives the first RTP packet and the time at which the UE receives the second RTP packet.

For ease of description, the last RTP packet received by the UE before the receiving manner is switched and the first RTP packet received by the UE after the receiving manner is switched are distinguished. The first RTP packet is the last RTP packet that is received by the UE on a transmission path used before RTP packet receiving path switching and that is received before the receiving manner is switched, and the second RTP packet is the first RTP packet that is received by the UE on a transmission path used after the RTP packet receiving path switching and that is received after the receiving manner is switched.

The time difference between the time at which the UE receives the first RTP packet and the time at which the UE receives the second RTP packet is obtained in one of the following two manners.

Manner 1: The GCS AS receives the QoE metric reported by the UE, obtains, from the QoE metric, the first timestamp identifier of the first RTP packet received by the UE and the second timestamp identifier of the second RTP packet received by the UE, and determines the time difference between the first RTP packet and the second RTP packet according to the first timestamp identifier and the second timestamp identifier.

In this manner, the UE obtains the first timestamp identifier of the first RTP packet received before the switching and the second timestamp identifier of the second RTP packet received after the switching. The UE uses the first timestamp identifier and the second timestamp identifier as the measurement result, and reports the measurement result.

When determining the first RTP packet and the second RTP packet, the UE records a first timestamp identifier of the first RTP packet and a second timestamp identifier of the second RTP packet, and the UE reports the QoE metric in which the first timestamp identifier and the second timestamp identifier are recorded. The GCS AS determines the time difference between the first RTP packet and the second RTP packet according to the first timestamp identifier and the second timestamp identifier that are reported by the UE.

Manner 2: The time difference that is between the first RTP packet and the second RTP packet and that is reported by the UE is received.

In this manner, the UE obtains the first timestamp identifier of the first RTP packet received before the switching and the second timestamp identifier of the second RTP packet received after the switching, and determines the time difference according to the first timestamp identifier and the second timestamp identifier. The UE uses the determined time difference between the first RTP packet and the second RTP packet as the measurement result, and reports the measurement result.

When determining the first RTP packet and the second RTP packet, the UE records a first timestamp of the first RTP packet and a second timestamp of the second RTP packet, and the UE determines the time difference between the first RTP packet and the second RTP packet according to the first timestamp and the second timestamp. Finally, the UE reports the determined time difference to the GCS AS.

The GCS AS calculates, according to the obtained time difference, the delay difference of transmitting the RTP packet in the different transmission manners, and adjusts, according to the delay difference, the time at which the RTP packet is transmitted in the unicast transmission manner.

The GCS AS calculates, in one of the following manners, the delay difference of transmitting the RTP packet in the different transmission manners.

Manner 1: A maximum time difference is selected from received time differences as the delay difference of transmitting the RTP packet in the different transmission manners.

In this manner, the system includes one UE. The UE is moving, and the UE in the system is switched between different RTP packet transmission paths. The GCS AS receives a time difference corresponding to the UE that is switched, and may select, according to the time difference, a maximum time difference from a received specified time difference range as the delay difference of transmitting the RTP packet in the different transmission manners.

Manner 2: An average value of received time differences is determined, and the average value is used as the delay difference of transmitting the RTP packet in the different transmission manners.

In this manner, the system includes a UE. The UE is moving, and the UE in the system is switched between different RTP packet transmission paths. The GCS AS receives a time difference corresponding to the UE that is switched, and may determine, according to the time difference, an average value of all received time differences from a received specified time difference range, and use the determined average value as the delay difference of transmitting the RTP packet in the different transmission manners.

The GCS AS delays, according to the obtained delay difference, the time at which the RTP packet is transmitted in the unicast transmission manner.

For example, the GCS AS provides, according to the obtained delay difference, delay compensation for the time at which the RTP packet is transmitted in the unicast transmission manner, that is, the GCS AS delays sending of an RTP packet on a unicast path, and delayed time is the delay difference obtained by the GCS AS.

Figure 7:
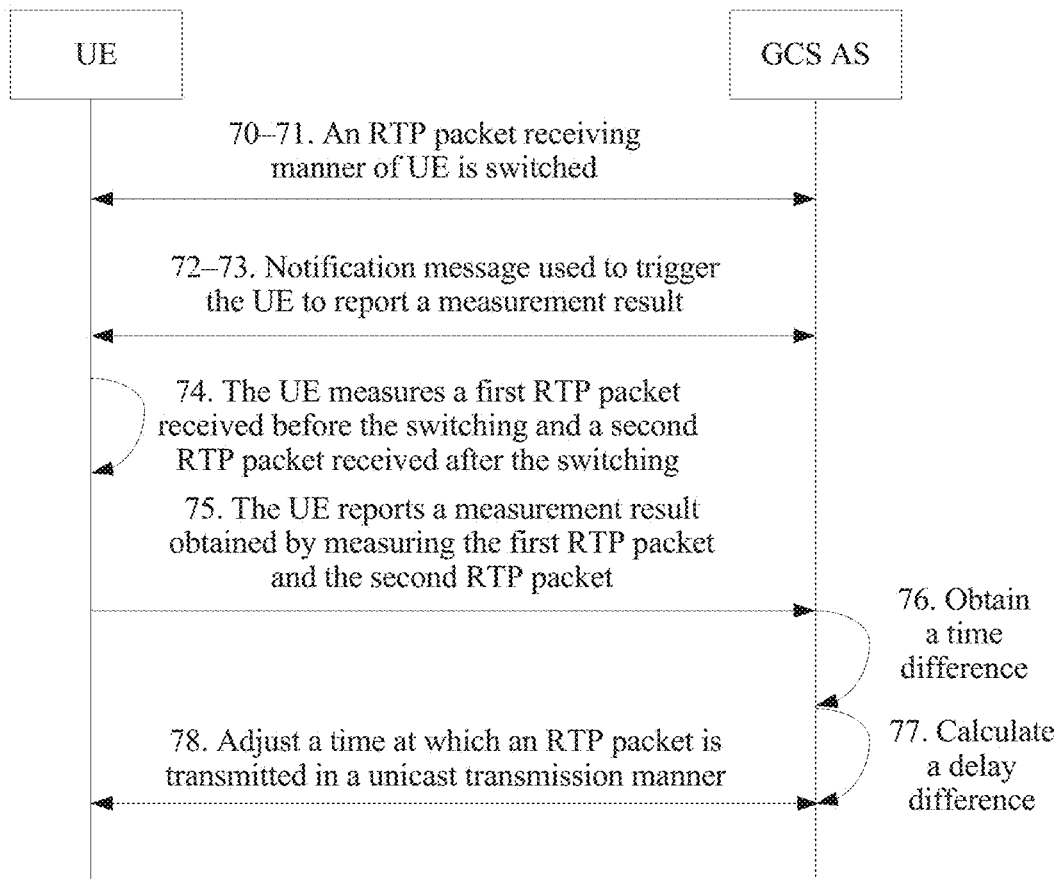
FIG. 7 is a flowchart of a group communication method.

Correspondingly, based on the foregoing system architecture, Embodiment 1 provides a group communication method. As shown in FIG. 7, a specific processing procedure of the method is as follows.

Step 70: UE receives an RTP packet in an MC transmission manner or a UC transmission manner.

Step 71: An RTP packet receiving manner of the UE is switched.

The RTP packet receiving manner of the UE includes two receiving manners: the unicast transmission manner and the multicast transmission manner.

Step 72: A GCS AS sends a notification message used to trigger the UE to report a measurement result.

The measurement result is obtained by the UE by measuring a received first RTP packet and a received second RTP packet. The measurement result obtained by the UE by measuring the first RTP packet and the second RTP packet may be carried by using a QoE metric.

Step 73: The UE receives the notification message used to trigger the UE to report the measurement result.

Step 74: The UE measures a first RTP packet received before the switching and a second RTP packet received after the switching.

Step 75: The UE reports a measurement result obtained by measuring the first RTP packet and the second RTP packet.

The QoE metric is used for configuring and storing a measurement result obtained by the UE by measuring an RTP packet. For parameter setting of the QoE metric, refer to the foregoing Table 1. Details are not described herein again.

In an example implementation, in the technical solution provided in Embodiment 1, the parameter setting of the QoE metric is as follows. A case in which the UE is switched from UC to MC is identified by 0, a case in which the UE is switched from MC to UC and a switching manner is "make before break" is identified by 1, and a case in which the UE is switched from MC to UC and a switching manner is "break before make" is identified by 2. The UE needs to fill, in the QoE metric received by the UE, an SN and a timestamp identifier that are of the last RTP packet received before the RTP packet receiving manner is switched and an SN and a timestamp identifier that are of the first RTP packet received after the RTP packet receiving manner is switched.

For ease of description, in the technical solution provided in Embodiment 1, the last RTP packet received by the UE before the receiving manner is switched and the first RTP packet received by the UE after the receiving manner is switched are distinguished. The first RTP packet is the last RTP packet that is received by the UE on a transmission path used before RTP packet receiving path switching and that is received before the receiving manner is switched, and the second RTP packet is the first RTP packet that is received by the UE on a transmission path used after the RTP packet receiving path switching and that is received after the receiving manner is switched.

The GCS AS may send, in the following manners, the notification message that includes the QoE metric.

Manner 1: The GCS AS sends the notification message by using a GC1 interface signaling message.

The GCS AS determines configuration information of the quality of experience metric used to carry the measurement result, and sends, by using the GC1 interface signaling message, the notification message that includes the configuration information of the quality of experience metric.

In this manner, the GCS AS configures the QoE metric by using an application layer message.

Alternatively, the GCS AS may configure the QoE metric in the following different manners.

A: The GCS AS configures the QoE metric by using a GC1 interface signaling message such as a SIP message.

B: The GCS AS configures the QoE metric by extending SDP parameter description of a GC1 interface.

In this manner, an SDP parameter attribute may be added, to configure the QoE metric.

Correspondingly, the UE reports the measurement result in the QoE metric in one of the following manners.

A: The UE receives the notification message from the GCS AS, and obtains the QoE metric from the notification message. The UE configures the QoE metric according to RTP packet detection results obtained before and after the RTP packet receiving manner is switched. The UE reports the configured QoE metric to the GCS AS by using a GC1 interface signaling message such as a SIP message.

B: The UE receives the notification message from the GCS AS, and obtains the QoE metric from the notification message. The UE configures the QoE metric according to RTP packet detection results obtained before and after the RTP packet receiving manner is switched. The UE reports the configured QoE metric to the GCS AS by using the Hypertext Transfer Protocol (HTTP).

Manner 2: The GCS AS sends the notification message by using a broadcast/multicast service center BM-SC.

Figure 8:
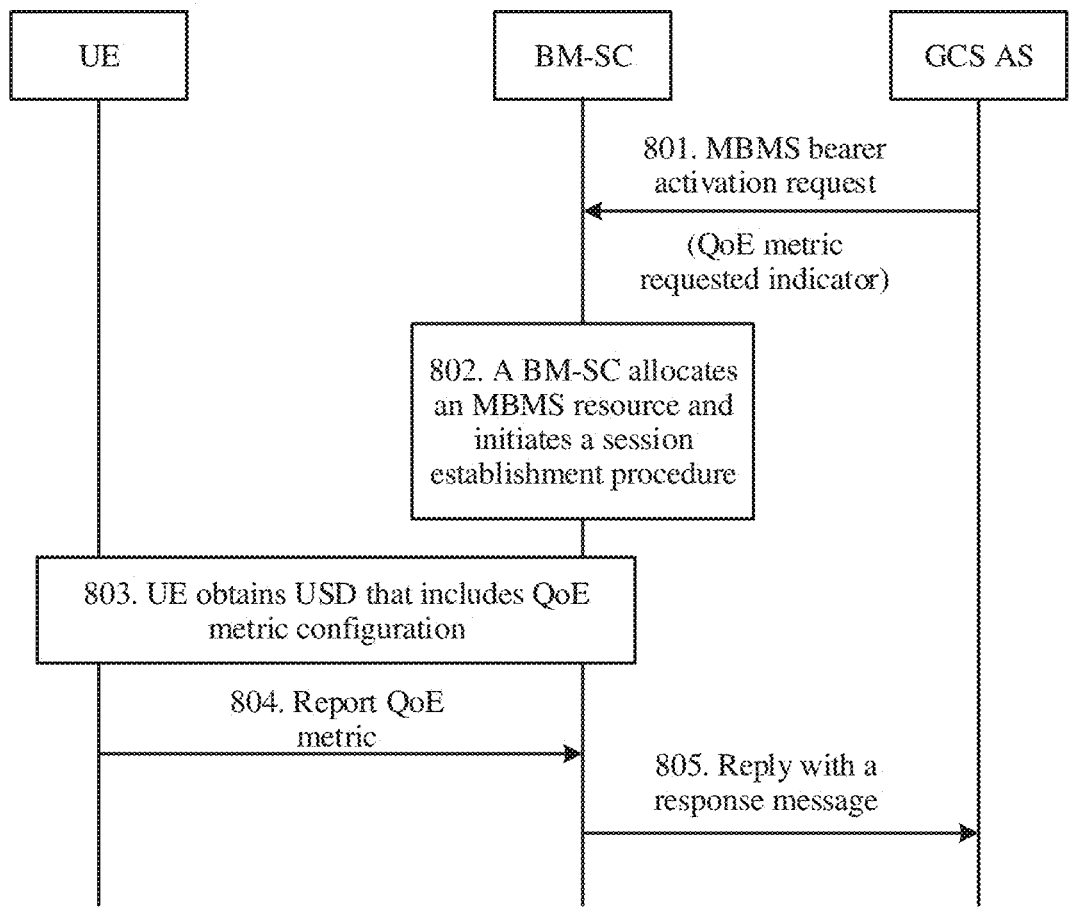
FIG. 8 is a flowchart of delivering and reporting a QoE metric according to 3GPP stipulations.

In this manner, delivery and reporting of the QoE metric are completed between the GCS AS and the UE according to 3GPP stipulations. As shown in FIG. 8, a specific processing procedure of the delivery and reporting of the QoE metric is as follows.

Step 801: The GCS AS sends an MBMS bearer activation request message to the BM-SC.

The GCS AS includes a QoE metric requested indicator to the request message. The parameter is used to instruct the BM-SC to configure the QoE metric.

Step 802: The BM-SC receives the request message sent by the GCS AS; and when receiving the request message, allocates an MBMS resource and initiates a session establishment procedure.

When creating USD, the BM-SC adds the QoE metric to ADP metadata.

Step 803: The UE obtains USD from the BM-SC.

The USD obtained by the UE includes the QoE metric.

The UE obtains the USD from the BM-SC, and the UE fills in a QoE metric parameter matrix (a value) according to the QoE metric in the obtained USD and RTP packet detection results.

Step 804: The UE reports a QoE metric to the BM-SC according to a QoE metric reporting procedure.

Step 805: The BM-SC replies to the GCS AS with a response message for an MBMS bearer activation request.

The BM-SC receives the QoE reported by the UE, and forwards, to the GCS AS, the QoE metric reported by the UE.

The BM-SC may forward, to the GCS AS in the following two manners, the QoE metric reported by the UE.

A: The QoE metric reported by the UE is forwarded to the GCS AS by using a transmission status indication message.

In this manner, the QoE metric reported by the UE is added to the indication message.

B: The QoE metric reported by the UE is forwarded to the GCS AS by extending a message header of an RTCP RR.

A field used to describe the QoE metric is added to the message header of the RTCP RR.

For an example implementation, refer to FIG. 6*b*. The field used to describe the QoE metric is extended to 32 bits.

Step 76: The GCS AS obtains a time difference between a time at which the UE receives the first RTP packet and a time at which the UE receives the second RTP packet.

The time difference between the time at which the UE receives the first RTP packet and the time at which the UE receives the second RTP packet is obtained in one of the following two manners.

Manner 1: The GCS AS receives the QoE metric reported by the UE, obtains, from the QoE metric, a first timestamp identifier of the first RTP packet received by the UE and a second timestamp identifier of the second RTP packet received by the UE, and determines the time difference between the first RTP packet and the second RTP packet according to the first timestamp identifier and the second timestamp identifier.

In this manner, the UE obtains the first timestamp identifier of the first RTP packet received before the switching and the second timestamp identifier of the second RTP packet received after the switching. The UE uses the first timestamp identifier and the second timestamp identifier as the measurement result, and reports the measurement result.

When determining the first RTP packet and the second RTP packet, the UE records a first timestamp of the first RTP packet and a second timestamp of the second RTP packet, and the UE reports the QoE metric in which the first timestamp and the second timestamp are recorded. The GCS AS determines the time difference between the first RTP packet and the second RTP packet according to the first timestamp and the second timestamp that are reported by the UE.

Manner 2: The time difference that is between the first RTP packet and the second RTP packet and that is reported by the UE is received.

In this manner, the UE obtains the first timestamp identifier of the first RTP packet received before the switching and the second timestamp identifier of the second RTP packet received after the switching, and determines the time difference according to the first timestamp identifier and the second timestamp identifier. The UE uses the determined time difference between the first RTP packet and the second RTP packet as the measurement result, and reports the measurement result.

When determining the first RTP packet and the second RTP packet, the UE records a first timestamp of the first RTP packet and a second timestamp of the second RTP packet, and the UE determines the time difference between the first RTP packet and the second RTP packet according to the first timestamp and the second timestamp. Finally, the UE reports the determined time difference to the GCS AS.

Step 77: The GCS AS calculates, according to the time difference, a delay difference of transmitting an RTP packet in different transmission manners.

The GCS AS calculates, in one of the following manners, the delay difference of transmitting the RTP packet in the different transmission manners.

Manner 1: A maximum time difference is selected from received time differences as the delay difference of transmitting the RTP packet in the different transmission manners.

In this manner, the system includes one UE. The UE is moving, and the UE in the system is switched between different RTP packet transmission paths. The GCS AS receives a time difference corresponding to the UE that is switched, and may select, according to the time difference, a maximum time difference from a received specified time difference range as the delay difference of transmitting the RTP packet in the different transmission manners.

Manner 2: An average value of received time differences is determined, and the average value is used as the delay difference of transmitting the RTP packet in the different transmission manners.

In this manner, the system includes one UE. The UE is moving, and the UE in the system is switched between different RTP packet transmission paths. The GCS AS receives a time difference corresponding to the UE that is switched, and may determine, according to the time difference, an average value of all received time differences from a received specified time difference range, and use the determined average value as the delay difference of transmitting the RTP packet in the different transmission manners.

Step 78: Adjust, according to the delay difference, a time at which the RTP packet is transmitted in the unicast transmission manner.

The time at which the RTP packet is transmitted in the unicast transmission manner is delayed according to the delay difference.

The GCS AS delays, according to the obtained delay difference, the time at which the RTP packet is transmitted in the unicast transmission manner.

For example, the GCS AS provides, according to the obtained delay difference, delay compensation for the time at which the RTP packet is transmitted in the unicast transmission manner, that is, the GCS AS delays sending of an RTP packet on a unicast path, and delayed time is the delay difference obtained by the GCS AS.

Correspondingly, this embodiment provides a group communication method. A specific processing procedure of the method is as follows.

Step 1: When an RTP packet receiving manner of UE is switched, a GCS AS obtains a time difference between a time at which the UE receives a first RTP packet before the switching and a time at which the UE receives a second RTP packet after the switching.

The receiving manner includes a unicast transmission manner and a multicast transmission manner. The first RTP packet is the last RTP packet that is received by the UE on a transmission path used before RTP packet receiving path switching and that is received before the RTP packet receiving manner of the UE is switched. The second RTP packet is the first RTP packet that is received by the UE on a transmission path used after the RTP packet receiving path switching and that is received after the RTP packet receiving manner of the UE is switched.

The time difference between the first RTP packet and the second RTP packet may be obtained in one of the following manners.

Manner 1: A first timestamp identifier of the first RTP packet received by the UE and a second timestamp identifier of the second RTP packet received by the UE are received, where the first timestamp identifier and the second timestamp identifier are reported by the UE, and the time difference between the first RTP packet and the second RTP packet is determined according to the first timestamp identifier and the second timestamp identifier.

Manner 2: The time difference that is between the first RTP packet and the second RTP packet and that is reported by the UE is received.

The time difference is calculated by the UE according to the first timestamp identifier of the first RTP packet received by the UE and the second timestamp identifier of the second RTP packet received by the UE.

Step 2: The GCS AS calculates, according to the time difference, a delay difference of transmitting an RTP packet in different transmission manners.

The calculating, according to the time difference, a delay difference of transmitting an RTP packet in different transmission manners includes the following.

A: A maximum time difference is selected from received time differences as the delay difference of transmitting the RTP packet in the different transmission manners.

B: An average value of multiple obtained time differences is determined, and the average value is used as the delay difference of transmitting the RTP packet in the different transmission manners.

Step 3: Adjust, according to the delay difference, a time at which the RTP packet is transmitted in the unicast transmission manner.

The time at which the RTP packet is transmitted in the unicast transmission manner is delayed according to the delay difference.

Optionally, before the obtaining a time difference between a first RTP packet and a second RTP packet, the method further includes:

ending, by the GCS AS, a notification message used to trigger the UE to report a measurement result.

The measurement result is the first timestamp identifier of the first RTP packet received by the UE and the second timestamp identifier of the second RTP packet received by the UE, or is the time difference calculated by the UE according to the first timestamp identifier of the received first RTP packet and the second timestamp identifier of the second RTP packet received by the UE.

The notification message may be sent in the following manner.

The notification message is sent by using a GC1 interface signaling message, or the notification message is sent by using a BM-SC.

The notification message includes a quality of experience metric, and the quality of experience metric that carries the measurement result and that is reported by the UE is received.

The quality of experience metric reported by the UE is received in one of the following manners.

Manner 1: The quality of experience metric that carries the measurement result and that is reported by the UE by using the GC1 interface signaling message is received.

Manner 2: The quality of experience metric that carries the measurement result and that is reported by the UE by using the HTTP is received.

Manner 3: The quality of experience metric that carries the measurement result and that is reported by the UE by using the BM-SC is received.

Figure 9A:
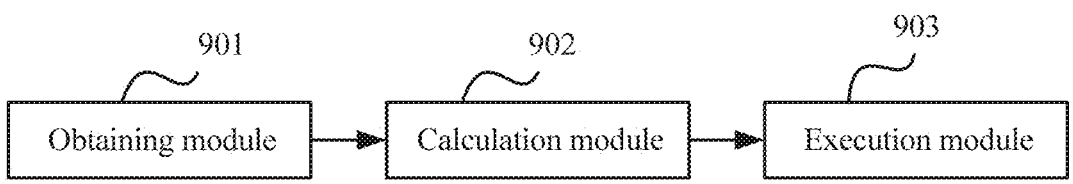
FIG. 9a is a schematic diagram of structural composition of a group communications apparatus.

Correspondingly, Embodiment 1 further provides a group communications apparatus. As shown in FIG. 9a, the apparatus includes an obtaining module 901, a calculation module 902, and an execution module 903.

The obtaining module 901 is configured to: when a Real-Time Transport Protocol RTP packet receiving manner of user equipment UE is switched, obtain a time difference between a time at which the UE receives a first RTP packet before the switching and a time at which the UE receives a second RTP packet after the switching, and transmit the time difference to the calculation module. The receiving manner includes a unicast transmission manner and a multicast transmission manner.

The obtaining module 901 is configured to: receive a first timestamp identifier of the first RTP packet received by the UE and a second timestamp identifier of the second RTP packet received by the UE, where the first timestamp identifier and the second timestamp identifier are reported by the UE, and determine the time difference between the first RTP packet and the second RTP packet according to the first timestamp identifier and the second timestamp identifier; or receive the time difference that is between the first RTP packet and the second RTP packet and that is reported by the UE, where the time difference is calculated by the UE according to a first timestamp identifier of the first RTP packet received by the UE and a second timestamp identifier of the second RTP packet received by the UE.

In the time difference that is obtained by the obtaining module 901 and that is between the time at which the UE receives the first RTP packet before the switching and the time at which the UE receives the second RTP packet after the switching, the first RTP packet is the last RTP packet that is received by the UE on a transmission path used before RTP packet receiving path switching and that is received before the RTP packet receiving manner of the UE is switched, and the second RTP packet is the first RTP packet that is received by the UE on a transmission path used after the RTP packet receiving path switching and that is received after the RTP packet receiving manner of the UE is switched.

The calculation module 902 is configured to: calculate, according to the time difference transmitted by the obtaining module, a delay difference of transmitting an RTP packet in different transmission manners, and transmit the delay difference to the execution module.

The calculation module 902 is configured to: select a maximum time difference from obtained time differences as the delay difference of transmitting the RTP packet in the different transmission manners; or determine an average value of multiple obtained time differences, and use the average value as the delay difference of transmitting the RTP packet in the different transmission manners.

The execution module 903 is configured to adjust, according to the delay difference transmitted by the calculation module, a time at which the RTP packet is transmitted in the unicast transmission manner.

The execution module 903 is configured to delay, according to the delay difference, the time at which the RTP packet is transmitted in the unicast transmission manner.

Optionally, the apparatus further includes: a sending module, configured to send a notification message used to trigger the UE to report a measurement result, where the measurement result is the first timestamp identifier of the first RTP packet received by the UE and the second timestamp identifier of the second RTP packet received by the UE, or is the time difference calculated by the UE according to the first timestamp identifier of the first RTP packet received by the UE and the second timestamp identifier of the second RTP packet received by the UE.

The sending module is configured to send the notification message in the following manner: sending the notification message by using a GC1 interface signaling message, or sending the notification message by using a broadcast/multicast service center BM-SC.

The sent notification message includes a quality of experience metric.

The apparatus further includes: a receiving module, configured to receive the quality of experience metric that carries the measurement result and that is reported by the UE.

The receiving module is configured to receive, in one of the following manners, the quality of experience metric reported by the UE: receiving the quality of experience metric that carries the measurement result and that is reported by the UE by using the GC1 interface signaling message; receiving the quality of experience metric that carries the measurement result and that is reported by the UE by using the Hypertext Transfer Protocol (HTTP); or receiving the quality of experience metric that carries the measurement result and that is reported by the UE by using the BM-SC.

Figure 9B:
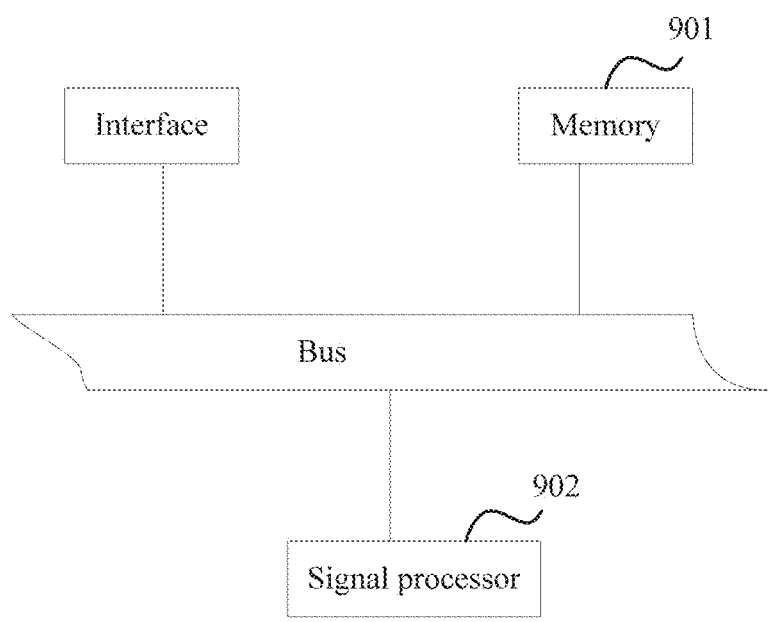
FIG. 9b is a schematic diagram of structural composition of a group communications device.
Figure 10:
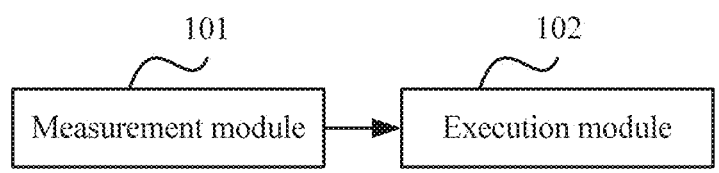
FIG. 10 is a schematic diagram of structural composition of a group communications apparatus.

Correspondingly, Embodiment 1 further provides a group communications device. As shown in FIG. 9b, the device includes a memory and a signal processor that are connected by using a bus.

The memory 901 is a non-transitory memory configured to store a program instruction.

The non-transitory memory may be a volatile memory such as a random-access memory (RAM); or a nonvolatile memory such as a flash memory, a hard disk drive (HDD), or a solid state drive (SSD); or a combination of such types of memories.

The signal processor 902 is configured to: obtain the program instruction stored in the memory 901, and perform the following steps according to the program instruction:

when a Real-Time Transport Protocol RTP packet receiving manner of user equipment UE is switched, obtaining a time difference between a time at which the UE receives a first RTP packet before the switching and a time at which the UE receives a second RTP packet after the switching, where the receiving manner includes a unicast transmission manner and a multicast transmission manner; calculating, according to the time difference, a delay difference of transmitting an RTP packet in different transmission manners, and transmitting the delay difference to an execution module; and adjusting, according to the delay difference, a time at which the RTP packet is transmitted in the unicast transmission manner.

The signal processor may be a central processing unit (CPU), or a combination of a CPU and a hardware chip. Alternatively, the signal processor may be a network processor (NP), or a combination of a CPU and an NP, or a combination of an NP and a hardware chip.

The hardware chip may be one or a combination of the following: an application-specific integrated circuit (ASIC), a field-programmable gate array (FPGA), or a complex programmable logical device (CPLD).

The signal processor 902 is configured to: receive a first timestamp identifier of the first RTP packet received by the UE and a second timestamp identifier of the second RTP packet received by the UE, where the first timestamp identifier and the second timestamp identifier are reported by the UE, and determine the time difference between the first RTP packet and the second RTP packet according to the first timestamp identifier and the second timestamp identifier; or receive the time difference that is between the first RTP packet and the second RTP packet and that is reported by the UE, where the time difference is calculated by the UE according to a first timestamp identifier of the first RTP packet received by the UE and a second timestamp identifier of the second RTP packet received by the UE.

The signal processor 902 is configured to: select a maximum time difference from obtained time differences as the delay difference of transmitting the RTP packet in the different transmission manners; or determine an average value of multiple obtained time differences, and use the average value as the delay difference of transmitting the RTP packet in the different transmission manners.

The signal processor 902 is configured to delay, according to the delay difference, the time at which the RTP packet is transmitted in the unicast transmission manner.

In the time difference that is obtained by the signal processor 902 and that is between the time at which the UE receives the first RTP packet before the switching and the time at which the UE receives the second RTP packet after the switching, the first RTP packet is the last RTP packet that is received by the UE on a transmission path used before RTP packet receiving path switching and that is received before the RTP packet receiving manner of the UE is switched; and the second RTP packet is the first RTP packet that is received by the UE on a transmission path used after the RTP packet receiving path switching and that is received after the RTP packet receiving manner of the UE is switched.

Optionally, the device further includes: an interface, configured to send a notification message used to trigger the UE to report a measurement result, where the measurement result is the first timestamp identifier of the first RTP packet received by the UE and the second timestamp identifier of the second RTP packet received by the UE, or is the time difference calculated by the UE according to the first timestamp identifier of the first RTP packet received by the UE and the second timestamp identifier of the second RTP packet received by the UE.

The interface may be one or more of the following: a network interface controller (NIC) that provides a wired interface, such as an Ethernet NIC that can provide a copper interface and/or a fiber interface; or a NIC that provides a wireless interface, such as a wireless local area network (WLAN) NIC.

The interface is configured to send the notification message in the following manner: sending the notification message by using a GC1 interface signaling message; or sending the notification message by using a broadcast/multicast service center BM-SC.

The notification message sent by the interface includes a quality of experience metric, and the quality of experience metric that carries the measurement result and that is reported by the UE is received.

The interface is configured to receive, in one of the following manners, the quality of experience metric reported by the UE: receiving the quality of experience metric that carries the measurement result and that is reported by the UE by using the GC1 interface signaling message; receiving the quality of experience metric that carries the measurement result and that is reported by the UE by using the Hypertext Transfer Protocol (HTTP); or receiving the quality of experience metric that carries the measurement result and that is reported by the UE by using the BM-SC.

Correspondingly, Embodiment 1 provides a group communication method. A specific processing procedure of the method is as follows.

Step 1: When a Real-Time Transport Protocol RTP packet receiving manner of UE is switched, the UE measures a first RTP packet received before the switching and a second RTP packet received after the switching.

The receiving manner includes a unicast transmission manner and a multicast transmission manner.

Step 2: The UE reports a measurement result obtained by measuring the first RTP packet and the second RTP packet.

That the UE measures a first RTP packet received before the switching and a second RTP packet received after the switching includes: obtaining, by the UE, a first timestamp identifier of the first RTP packet received before the switching and a second timestamp identifier of the second RTP packet received after the switching. Correspondingly, that the UE reports a measurement result obtained by measuring the first RTP packet and the second RTP packet includes: using, by the UE, the first timestamp identifier and the second timestamp identifier as the measurement result, and reporting the measurement result.

That the UE measures a first RTP packet received before the switching and a second RTP packet received after the switching includes: obtaining, by the UE, a first timestamp identifier of the first RTP packet received before the switching and a second timestamp identifier of the second RTP packet received after the switching, and determining a time difference according to the first timestamp identifier and the second timestamp identifier. Correspondingly, that the UE reports a measurement result obtained by measuring the first RTP packet and the second RTP packet includes: using, by the UE, the determined time difference between the first RTP packet and the second RTP packet as the measurement result, and reporting the measurement result.

Optionally, before that the UE measures a first RTP packet received before the switching and a second RTP packet received after the switching, the method further includes: receiving a notification message used to trigger the UE to report the measurement result. The measurement result is the first timestamp identifier of the first RTP packet received by the UE and the second timestamp identifier of the second RTP packet received by the UE, or is the time difference calculated by the UE according to the first timestamp identifier of the first RTP packet received by the UE and the second timestamp identifier of the second RTP packet received by the UE.

The UE receives the notification message in the following manner: receiving the notification message by using a GC1 interface signaling message; or receiving the notification message by using a broadcast/multicast service center BM-SC.

The notification message includes a quality of experience metric, and the UE reports the quality of experience metric that carries the measurement result.

The UE reports, in one of the following manners, the quality of experience metric that carries the measurement result: reporting, by the UE by using a GC1 interface signaling message, the quality of experience metric that carries the measurement result; reporting, by the UE by using the Hypertext Transfer Protocol (HTTP), the quality of experience metric that carries the measurement result; or reporting, by the UE by using the BM-SC, the quality of experience metric that carries the measurement result.

The first RTP packet is the last RTP packet that is received by the UE on a transmission path used before RTP packet receiving path switching and that is received before the RTP packet receiving manner of the UE is switched, and the second RTP packet is the first RTP packet that is received by the UE on a transmission path used after the RTP packet receiving path switching and that is received after the RTP packet receiving manner of the UE is switched.

Correspondingly, this embodiment further provides a group communications apparatus. As shown in FIG. to, the apparatus includes: a measurement module 101, configured to: when a Real-Time Transport Protocol RTP packet receiving manner of user equipment UE is switched, measure a first RTP packet received before the switching and a second RTP packet received after the switching, where the receiving manner includes a unicast transmission manner and a multicast transmission manner; and an execution module 102, configured to report a measurement result obtained by measuring the first RTP packet and the second RTP packet.

The measurement module 101 is configured to obtain a first timestamp identifier of the first RTP packet received before the switching and a second timestamp identifier of the second RTP packet received after the switching. The execution module 102 is configured to: use the first timestamp identifier and the second timestamp identifier as the measurement result, and report the measurement result.

The measurement module 101 is configured to: obtain a first timestamp identifier of the first RTP packet received before the switching and a second timestamp identifier of the second RTP packet received after the switching, and determine a time difference according to the first timestamp identifier and the second timestamp identifier. The execution module 102 is configured to: use the determined time difference between the first RTP packet and the second RTP packet as the measurement result, and report the measurement result.

Optionally, the apparatus further includes: a receiving module, configured to receive a notification message used to trigger the UE to report the measurement result. The measurement result is the first timestamp identifier of the received first RTP packet and the second timestamp identifier of the received second RTP packet, or is the time difference calculated according to the first timestamp identifier of the received first RTP packet and the second timestamp identifier of the received second RTP packet.

The receiving module is configured to receive the notification message in the following manner: receiving the notification message by using a GC1 interface signaling message; or receiving the notification message by using a broadcast/multicast service center BM-SC.

The notification message includes a quality of experience metric, and the execution module is configured to report the quality of experience metric that carries the measurement result.

The execution module is configured to report, in one of the following manners, the quality of experience metric that carries the measurement result: reporting, by using a GC1 interface signaling message, the quality of experience metric that carries the measurement result; reporting, by using the Hypertext Transfer Protocol (HTTP), the quality of experience metric that carries the measurement result; or reporting, by using the BM-SC, the quality of experience metric that carries the measurement result.

The first RTP packet measured by the measurement module, is the last RTP packet that is received on a transmission path used before RTP packet receiving path switching and that is received before the RTP packet receiving manner is switched, and the second RTP packet measured by the measurement module is the first RTP packet that is received on a transmission path used after the RTP packet receiving path switching and that is received after the RTP packet receiving manner is switched.

Correspondingly, Embodiment 1 of the present invention further provides a group communications device. Structural composition of the device is shown in FIG. 9b, and the device includes: a memory, configured to store a program instruction; a signal processor, configured to: obtain the program instruction stored in the memory, and perform the following steps according to the program instruction: when a Real-Time Transport Protocol RTP packet receiving manner of user equipment UE is switched, measuring a first RTP packet received before the switching and a second RTP packet received after the switching, where the receiving manner includes a unicast transmission manner and a multicast transmission manner; and an interface, configured to report a measurement result obtained by measuring the first RTP packet and the second RTP packet.

The signal processor is configured to obtain a first timestamp identifier of the first RTP packet received before the switching and a second timestamp identifier of the second RTP packet received after the switching. The interface is configured to: use the first timestamp identifier and the second timestamp identifier as the measurement result, and report the measurement result.

The signal processor is configured to: obtain a first timestamp identifier of the first RTP packet received before the switching and a second timestamp identifier of the second RTP packet received after the switching, and determine a time difference according to the first timestamp identifier and the second timestamp identifier. The interface is configured to: use the determined time difference between the first RTP packet and the second RTP packet as the measurement result, and report the measurement result.

The interface is further configured to receive a notification message used to trigger the UE to report the measurement result. The measurement result is the first timestamp identifier of the received first RTP packet and the second timestamp identifier of the received second RTP packet, or is the time difference calculated according to the first timestamp identifier of the received first RTP packet and the second timestamp identifier of the received second RTP packet.

The interface is configured to receive the notification message in the following manner: receiving the notification message by using a GC1 interface signaling message; or receiving the notification message by using a broadcast/multicast service center BM-SC.

The notification message includes a quality of experience metric, and the interface is configured to report the quality of experience metric that carries the measurement result.

The interface is configured to report, in one of the following manners, the quality of experience metric that carries the measurement result: reporting, by using a GC1 interface signaling message, the quality of experience metric that carries the measurement result; reporting, by using the Hypertext Transfer Protocol (HTTP), the quality of experience metric that carries the measurement result; or reporting, by using the BM-SC, the quality of experience metric that carries the measurement result.

The first RTP packet measured by the signal processor is the last RTP packet that is received on a transmission path used before RTP packet receiving path switching and that is received before the RTP packet receiving manner is switched, and the second RTP packet measured by the signal processor is the first RTP packet that is received on a transmission path used after the RTP packet receiving path switching and that is received after the RTP packet receiving manner is switched.

Embodiment 2

Embodiment 2 of the present application provides, according to some embodiments, a group communications system, and structural composition of the system is shown in FIG. 3.

UE is configured to receive an RTP packet in an MC transmission manner or a UC transmission manner. An RTP packet receiving manner of the UE may be switched.

The RTP packet receiving manner of the UE may be switched in the following two switching cases.

Case 1: The UE is switched from the UC transmission manner to the MC transmission manner, to receive an RTP packet.

It can be learned from the detailed descriptions in Embodiment 1 and FIG. 6a that, in a switching process in this switching manner, the UE can simultaneously receive RTP packets on a UC transmission path and an MC transmission path, and after the switching, the UE receives, on the MC transmission path, some RTP packets that have been received on the UC transmission path, that is, the UE repeatedly receives some RTP packets in the process of switching from unicast to multicast. In a technical solution provided in Embodiment 2, in this case, the UE may choose to discard the repeatedly received RTP packets.

Case 2: The UE is switched from the MC transmission manner to the UC transmission manner, to receive an RTP packet.

Likewise, it can be learned from the detailed descriptions in Embodiment 1 and FIG. 6a that, in this case, a switching manner includes "make before break" and "break before make". However, an RTP packet is lost in either manner. Therefore, in a technical solution provided in Embodiment 2, when the RTP packet receiving manner of the UE is switched, the UE sends an RTP packet retransmission request. The RTP packet retransmission request includes an identifier of an RTP packet requested to be retransmitted.

In this case, the UE measures a received first RTP packet and a received second RTP packet, and determines the identifier of the RTP packet requested to be retransmitted. For ease of description, in the technical solution provided in Embodiment 2, the first RTP packet is the last RTP packet that is received by the UE on a transmission path used before RTP packet receiving path switching and that is received before the RTP packet receiving manner of the UE is switched, and the second RTP packet is the first RTP packet that is received by the UE on a transmission path used after the RTP packet receiving path switching and that is received after the RTP packet receiving manner of the UE is switched.

For example, in a switching process, if a sequence number of the last RTP packet received by the UE on MC is SNMC, and a sequence number of the first RTP packet received by the UE on UC is SNUC, sequence numbers of RTP packets requested by the UE to be transmitted are SNMC+1 to SNUC−1.

The UE sends the RTP packet retransmission request in one of the following manners.

Manner 1: The UE sends the RTP packet retransmission request by using a GC1 interface signaling message.

For example, the UE sends the RTP packet retransmission request to a GCS AS by using a Session Initiation Protocol (SIP) message.

Manner 2: The UE sends the RTP packet retransmission request by using the HITP.

Manner 3: The UE sends the RTP packet retransmission request by using an extended RTCP RR packet.

The UE sends the RTP packet retransmission request to the GCS AS by using an RTCP RR procedure.

As shown in FIG. 6b, in the technical solution provided in Embodiment 2, an RTCP RR packet is extended. In an example implementation, a 32-bit field is added, to extend the RTCP RR packet. The added field is used to describe a sequence number of the RTP packet that needs to be retransmitted.

The GCS AS is configured to: receive the RTP packet retransmission request sent by the UE, obtain, from the RTP packet retransmission request, the identifier of the RTP packet requested by the UE to be retransmitted, and retransmit the RTP packet corresponding to the identifier of the RTP packet.

The UE is configured to receive a retransmitted RTP packet.

In an optional implementation, in the technical solution provided in Embodiment 2, when the RTP packet receiving manner of the UE is switched, the GCS AS may send, to the UE, a notification message used to trigger the UE to report a measurement result obtained by measuring the first RTP packet and the second RTP packet. The measurement result obtained by the UE by measuring the first RTP packet and the second RTP packet may be carried by using a QoE metric. The QoE metric is used for configuring and storing a measurement result obtained by the UE by measuring an RTP packet. For parameter setting of the QoE metric, refer to Table 1 in the foregoing Embodiment 1. The UE fills in a "value" value according to the received QoE metric and a switching case. The UE needs to fill, in the QoE metric received by the UE, an SN and a timestamp identifier that are of the last RTP packet received before the RTP packet receiving manner is switched and an SN and a timestamp identifier that are of the first RTP packet received after the RTP packet receiving manner is switched.

The GCS AS may send, in the following manners, the notification message that includes the QoE metric.

Manner 1: The GCS AS sends the notification message by using a GC1 interface signaling message.

The GCS AS determines configuration information of the quality of experience metric used to carry the measurement result, and sends, by using the GC1 interface signaling message, the notification message that includes the configuration information of the quality of experience metric.

In this manner, the GCS AS configures the QoE metric by using an application layer message.

Alternatively, the GCS AS may configure the QoE metric in the following different manners.

A: The GCS AS configures the QoE metric by using a GC1 interface signaling message such as a SIP message.

B: The GCS AS configures the QoE metric by extending SDP parameter description of a GC1 interface.

In this manner, an SDP parameter attribute may be added, to configure the QoE metric.

Correspondingly, the UE reports the measurement result in the QoE metric in one of the following manners.

A: The UE receives the notification message from the GCS AS, and obtains the QoE metric from the notification message. The UE configures the QoE metric according to RTP packet detection results obtained before and after the RTP packet receiving manner is switched. The UE reports the configured QoE metric to the GCS AS by using a GC1 interface signaling message such as a SIP message.

B: The UE receives the notification message from the GCS AS, and obtains the QoE metric from the notification message. The UE configures the QoE metric according to RTP packet detection results obtained before and after the RTP packet receiving manner is switched. The UE reports the configured QoE metric to the GCS AS by using the Hypertext Transfer Protocol (HTTP).

Manner 2: The GCS AS sends the notification message by using a broadcast/multicast service center BM-SC.

In this manner, delivery and reporting of the QoE metric are completed between the GCS AS and the UE according to 3GPP stipulations.

The GCS AS is configured to send an MBMS bearer activation request message to the BM-SC.

The GCS AS includes a QoE metric requested indicator to the request message. The parameter is used to instruct the BM-SC to configure the QoE metric.

The BM-SC is configured to: receive the request message sent by the GCS AS; and when receiving the request message, allocate an MBMS resource and initiate a session establishment procedure. When creating user service description (USD), the BM-SC adds the QoE metric to associated delivery procedure (ADP) metadata.

The UE obtains the USD from the BM-SC.

The USD obtained by the UE includes the QoE metric. The UE obtains the USD from the BM-SC, and the UE fills in a QoE metric parameter matrix (a value) according to the QoE metric in the obtained USD and RTP packet detection results. The UE reports the QoE metric to the BM-SC according to a QoE metric reporting procedure.

The BM-SC replies to the GCS AS with a response message for an MBMS bearer activation request. The BM-SC receives the QoE metric reported by the UE, and forwards, to the GCS AS, the QoE metric reported by the UE.

The BM-SC may forward, to the GCS AS in the following two manners, the QoE metric reported by the UE.

A: The QoE metric reported by the UE is forwarded to the GCS AS by using a transmission status indication message.

In this manner, the QoE metric reported by the UE is added to the indication message.

B: The QoE metric reported by the UE is forwarded to the GCS AS by extending a message header of a Real-Time Transport Control Protocol (RTCP) Receiver Report (RR).

Figure 11A:
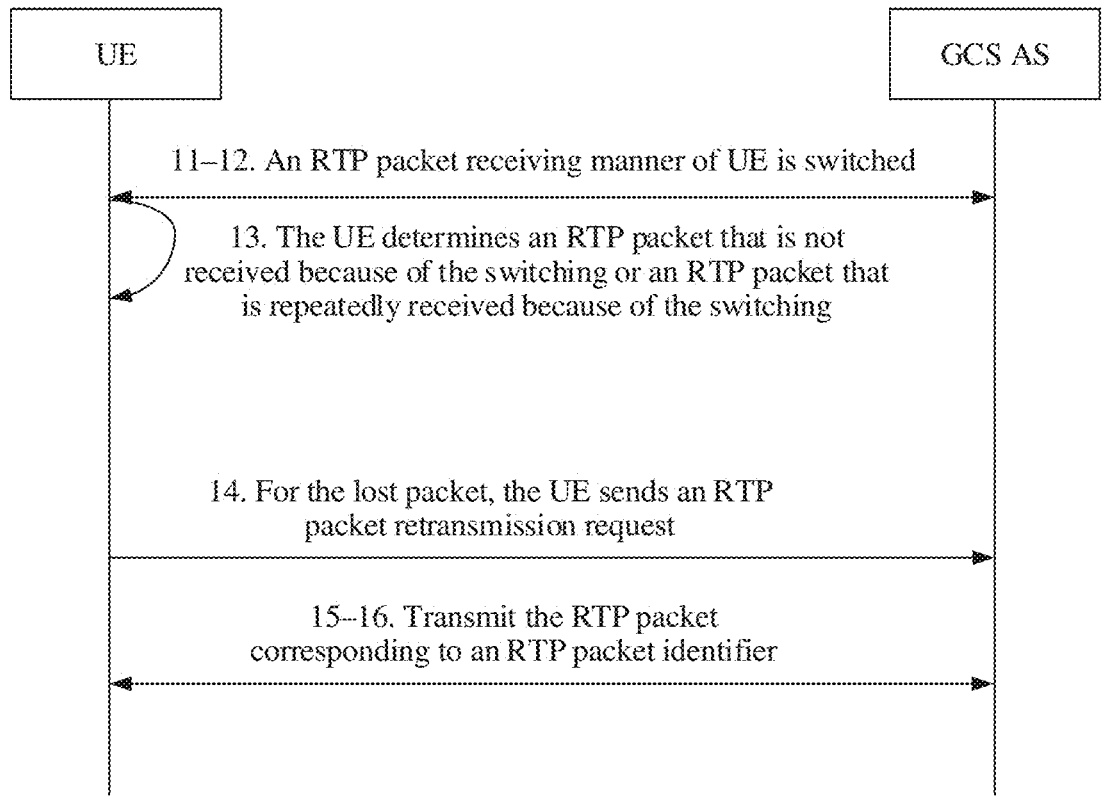
FIG. 11a is a flowchart of a group communication method.

Embodiment 2 provides a group communication method. As shown in FIG. 11a, a specific processing procedure of the method is as follows.

Step 11: UE receives an RTP packet in an MC transmission manner or a UC transmission manner.

Step 12: An RTP packet receiving manner of the UE is switched.

The RTP packet receiving manner of the UE includes two receiving manners: the unicast transmission manner and the multicast transmission manner.

Step 13: The UE determines an RTP packet that is not received because of the switching or an RTP packet that is repeatedly received because of the switching.

Case 1: The UE is switched from the UC transmission manner to the MC transmission manner, to receive an RTP packet.

It can be learned from the detailed descriptions in Embodiment 1 and FIG. 6a that, in a switching process in this switching manner, the UE can simultaneously receive RTP packets on a UC transmission path and an MC transmission path, and after the switching, the UE receives, on the MC transmission path, some RTP packets that have been received on the UC transmission path, that is, the UE repeatedly receives some RTP packets in the process of switching from unicast to multicast. In a technical solution provided in Embodiment 2, in this case, the UE may choose to discard the repeatedly received RTP packets.

Case 2: The UE is switched from the MC transmission manner to the UC transmission manner, to receive an RTP packet.

Likewise, it can be learned from the detailed descriptions in Embodiment 1 and FIG. 6a that, in this case, a switching manner includes "make before break" and "break before make". However, an RTP packet is lost in either manner. Therefore, in a technical solution provided in Embodiment 2, when the RTP packet receiving manner of the UE is switched, the UE sends an RTP packet retransmission request. The RTP packet retransmission request includes an identifier of an RTP packet requested to be retransmitted.

In this case, the UE measures a received first RTP packet and a received second RTP packet, and determines the identifier of the RTP packet requested to be retransmitted. For ease of description, in the technical solution provided in Embodiment 2, the first RTP packet is the last RTP packet that is received by the UE on a transmission path used before RTP packet receiving path switching and that is received before the RTP packet receiving manner of the UE is switched, and the second RTP packet is the first RTP packet that is received by the UE on a transmission path used after the RTP packet receiving path switching and that is received after the RTP packet receiving manner of the UE is switched.

Step 14: For the lost packet, the UE sends an RTP packet retransmission request.

The UE sends the RTP packet retransmission request in one of the following manners.

Manner 1: The UE sends the RTP packet retransmission request by using a GC1 interface signaling message.

For example, the UE sends the RTP packet retransmission request to a GCS AS by using a Session Initiation Protocol (SIP) message.

Manner 2: The UE sends the RTP packet retransmission request by using the HITP.

Manner 3: The UE sends the RTP packet retransmission request by using an extended RTCP RR packet.

The UE sends the RTP packet retransmission request to the GCS AS by using an RTCP RR procedure.

As shown in FIG. 6b, in the technical solution provided in Embodiment 2, an RTCP RR packet is extended. In an example implementation, a 32-bit field is added, to extend the RTCP RR packet. The added field is used to describe a sequence number of the RTP packet that needs to be retransmitted.

Step 15: The GCS AS receives the RTP packet retransmission request sent by the UE, obtains, from the RTP packet retransmission request, an identifier of the RTP packet requested by the UE to be retransmitted, and retransmits the RTP packet corresponding to the identifier of the RTP packet.

Step 16: The UE receives the retransmitted RTP packet.

In an optional implementation, in the technical solution provided in Embodiment 2, when the RTP packet receiving manner of the UE is switched, the GCS AS may send, to the UE, a notification message used to trigger the UE to report a measurement result obtained by measuring the first RTP packet and the second RTP packet. The measurement result obtained by the UE by measuring the first RTP packet and the second RTP packet may be carried by using a QoE metric. The QoE metric is used for configuring and storing a measurement result obtained by the UE by measuring an RTP packet. For parameter setting of the QoE metric, refer to Table 1 in the foregoing Embodiment 1. The UE fills in a "value" value according to the received QoE metric and a switching case. The UE needs to fill, in the QoE metric received by the UE, an SN and a timestamp identifier that are of the last RTP packet received before the RTP packet receiving manner is switched and an SN and a timestamp identifier that are of the first RTP packet received after the RTP packet receiving manner is switched.

The GCS AS may send, in the following manners, the notification message that includes the QoE metric.

Manner 1: The GCS AS sends the notification message by using a GC1 interface signaling message.

The GCS AS determines configuration information of the quality of experience metric used to carry the measurement result, and sends, by using the GC1 interface signaling message, the notification message that includes the configuration information of the quality of experience metric.

In this manner, the GCS AS configures the QoE metric by using an application layer message.

Alternatively, the GCS AS may configure the QoE metric in the following different manners.

A: The GCS AS configures the QoE metric by using a GC1 interface signaling message such as a SIP message.

B: The GCS AS configures the QoE metric by extending SDP parameter description of a GC1 interface.

In this manner, an SDP parameter attribute may be added, to configure the QoE metric.

Correspondingly, the UE reports the measurement result in the QoE metric in one of the following manners.

A: The UE receives the notification message from the GCS AS, and obtains the QoE metric from the notification message. The UE configures the QoE metric according to RTP packet detection results obtained before and after the RTP packet receiving manner is switched. The UE reports the configured QoE metric to the GCS AS by using a GC1 interface signaling message such as a SIP message.

B: The UE receives the notification message from the GCS AS, and obtains the QoE metric from the notification message. The UE configures the QoE metric according to RTP packet detection results obtained before and after the RTP packet receiving manner is switched. The UE reports the configured QoE metric to the GCS AS by using the Hypertext Transfer Protocol (HTTP).

Manner 2: The GCS AS sends the notification message by using a broadcast/multicast service center BM-SC.

In this manner, delivery and reporting of the QoE metric are completed between the GCS AS and the UE according to 3GPP stipulations.

The GCS AS is configured to send an MBMS bearer activation request message to the BM-SC.

The GCS AS includes a QoE metric requested indicator to the request message. The parameter is used to instruct the BM-SC to configure the QoE metric.

The BM-SC is configured to: receive the request message sent by the GCS AS; and when receiving the request message, allocate an MBMS resource and initiate a session establishment procedure. When creating user service description (USD), the BM-SC adds the QoE metric to associated delivery procedure (ADP) metadata.

The UE obtains the USD from the BM-SC.

The USD obtained by the UE includes the QoE metric. The UE obtains the USD from the BM-SC, and the UE fills in a QoE metric parameter matrix (a value) according to the QoE metric in the obtained USD and RTP packet detection results. The UE reports the QoE metric to the BM-SC according to a QoE metric reporting procedure.

The BM-SC replies to the GCS AS with a response message for an MBMS bearer activation request. The BM-SC receives the QoE metric reported by the UE, and forwards, to the GCS AS, the QoE metric reported by the UE.

The BM-SC may forward, to the GCS AS in the following two manners, the QoE metric reported by the UE.

A: The QoE metric reported by the UE is forwarded to the GCS AS by using a transmission status indication message.

In this manner, the QoE metric reported by the UE is added to the indication message.

B: The QoE metric reported by the UE is forwarded to the GCS AS by extending a message header of a Real-Time Transport Control Protocol (RTCP) Receiver Report (RR).

Correspondingly, Embodiment 2 provides a group communication method. A specific processing procedure of the method is as follows.

Step 1: When an RTP packet receiving manner of UE is switched, receive an RTP packet retransmission request sent by the UE.

The RTP packet retransmission request sent by the UE is received in one of the following manners.

A: The RTP packet retransmission request sent by the UE by using a GC1 interface signaling message is received.

B: The RTP packet retransmission request sent by the UE by using the Hypertext Transfer Protocol (HITP) is received.

C: The RTP packet retransmission request sent by the UE by using an extended RR RTCP packet is received.

Step 2: Resend an RTP packet to the UE in a unicast transmission manner according to an RTP packet identifier in the RTP packet retransmission request.

Correspondingly, Embodiment 2 provides a group communication method. A specific processing procedure of the method is as follows.

Step 1: When an RTP packet receiving manner of UE is switched, the UE sends an RTP packet retransmission request.

The RTP packet retransmission request includes an identifier of an RTP packet requested to be retransmitted.

Step 2: Receive a retransmitted RTP packet.

Optionally, before the sending, by the UE, an RTP packet retransmission request, the method further includes measuring, by the UE, a received first RTP packet and a received second RTP packet, and determining the identifier of the RTP packet requested to be retransmitted.

The first RTP packet is the last RTP packet that is received by the UE on a transmission path used before RTP packet receiving path switching and that is received before the RTP packet receiving manner of the UE is switched, and the second RTP packet is the first RTP packet that is received by the UE on a transmission path used after the RTP packet receiving path switching and that is received after the RTP packet receiving manner of the UE is switched.

The UE sends the RTP packet retransmission request in one of the following manners.

Manner 1: The UE sends the RTP packet retransmission request by using a GC1 interface signaling message.

Manner 2: The UE sends the RTP packet retransmission request by using the Hypertext Transfer Protocol (HTTP).

Manner 3: The UE sends the RTP packet retransmission request by using an extended Real-Time Transport Control Protocol (RTCP) RR packet.

Figure 11B:
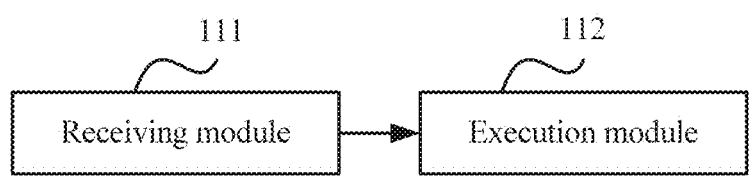
FIG. 11b is a schematic diagram of structural composition of a group communications apparatus.

Correspondingly, this embodiment of the present invention provides a group communications apparatus. As shown in FIG. 11b, the apparatus includes a receiving module 111 and an execution module 112.

The receiving module 111 is configured to: when a Real-Time Transport Protocol RTP packet receiving manner of user equipment UE is switched, receive an RTP packet retransmission request sent by the UE.

The receiving module 111 is configured to receive, in one of the following manners, the RTP packet retransmission request sent by the UE: receiving the RTP packet retransmission request that is sent by the UE by using a GC1 interface signaling message; receiving the RTP packet retransmission request that is sent by the UE by using the Hypertext Transfer Protocol (HITP); or receiving the RTP packet retransmission request that is sent by the UE by using an extended RR Real-Time Transport Control Protocol (RTCP) packet.

The execution module 112 is configured to resend an RTP packet to the UE in a unicast transmission manner according to an RTP packet identifier in the RTP packet retransmission request.

Figure 11C:
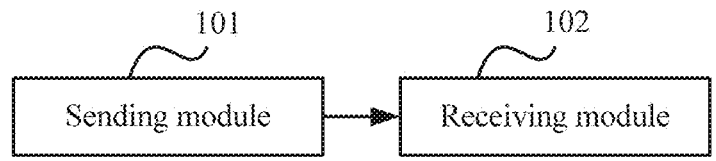
FIG. 11c is a schematic diagram of structural composition of a group communications apparatus.

Correspondingly, Embodiment 2 provides a group communications apparatus. As shown in FIG. 11c, the apparatus includes a sending module lot and a receiving module 102.

The sending module lot is configured to: when a Real-Time Transport Protocol RTP packet receiving manner is switched, send an RTP packet retransmission request, where the RTP packet retransmission request includes an identifier of an RTP packet requested to be retransmitted.

The sending module 101 is configured to send the RTP packet retransmission request in one of the following manners: sending the RTP packet retransmission request by using a GC1 interface signaling message; sending the RTP packet retransmission request by using the Hypertext Transfer Protocol (HTTP); or sending the RTP packet retransmission request by using an extended RR Real-Time Transport Control Protocol (RTCP) packet.

The receiving module 102 is configured to receive a retransmitted RTP packet.

Optionally, the apparatus further includes: a measurement module, configured to: measure a received first RTP packet and a received second RTP packet, and determine the identifier of the RTP packet requested to be retransmitted.

The first RTP packet measured by the measurement module is the last RTP packet that is received by the UE on a transmission path used before RTP packet receiving path switching and that is received before the RTP packet receiving manner of the UE is switched, and the second RTP packet measured by the measurement module is the first RTP packet that is received by the UE on a transmission path used after the RTP packet receiving path switching and that is received after the RTP packet receiving manner of the UE is switched.

Correspondingly, this embodiment of the present invention further provides a group communications device. Structural composition of the device is shown in FIG. 9b, and the device includes: an interface, configured to: when a Real-Time Transport Protocol RTP packet receiving manner of user equipment UE is switched, receive an RTP packet retransmission request sent by the UE; a memory, configured to store a program instruction; and a signal processor, configured to: obtain the program instruction stored in the memory, and perform the following step according to the program instruction: resending an RTP packet to the UE in a unicast transmission manner according to an RTP packet identifier in the RTP packet retransmission request.

The interface is configured to receive, in one of the following manners, the RTP packet retransmission request sent by the UE: receiving the RTP packet retransmission request that is sent by the UE by using a GC1 interface signaling message; receiving the RTP packet retransmission request that is sent by the UE by using the Hypertext Transfer Protocol (HTTP); or receiving the RTP packet retransmission request that is sent by the UE by using an extended RR Real-Time Transport Control Protocol (RTCP) packet.

Correspondingly, this embodiment of the present invention further provides a group communications device. Structural composition of the device is shown in FIG. 9b, and the device includes: a memory, configured to store a program instruction; and a signal processor, configured to: obtain the program instruction stored in the memory, and perform the following steps according to the program instruction: when a Real-Time Transport Protocol RTP packet receiving manner is switched, sending an RTP packet retransmission request by using an interface, where the RTP packet retransmission request includes an identifier of an RTP packet requested to be retransmitted; and receiving a retransmitted RTP packet by using the interface.

The signal processor is further configured to: measure a received first RTP packet and a received second RTP packet, and determine the identifier of the RTP packet requested to be retransmitted.

The first RTP packet measured by the signal processor is the last RTP packet that is received by the UE on a transmission path used before RTP packet receiving path switching and that is received before the RTP packet receiving manner of the UE is switched, and the second RTP packet measured by the signal processor is the first RTP packet that is received by the UE on a transmission path used after the RTP packet receiving path switching and that is received after the RTP packet receiving manner of the UE is switched.

The signal processor is configured to send the RTP packet retransmission request by using an interface in one of the following manners: sending the RTP packet retransmission request by using a GC1 interface signaling message; sending the RTP packet retransmission request by using the Hypertext Transfer Protocol (HTTP); or sending the RTP packet retransmission request by using an extended RR Real-Time Transport Control Protocol (RTCP) packet.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, a compact disc read-only memory, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are executed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although examples of embodiments of the present invention have been described, persons skilled in the art can make changes and modifications to these embodiments once they learn the basic inventive concept. Therefore, the following claims are intended to be construed as to cover the examples of embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A device, comprising:
a processor; and
a non-transitory computer-readable storage medium storing a program to be executed by the processor, when, with respect to a user equipment (UE), a Real-Time Transport Protocol (RTP) packet receiving manner of the UE is switched in a receiving manner switching from a first transmission manner to a second transmission manner, wherein the first transmission manner comprises one of a unicast transmission manner and a multicast transmission manner, and the second transmission manner comprises the other one of the unicast transmission manner and the multicast transmission manner, and wherein the second transmission manner and the first transmission manner correspond to a transmission delay difference between the unicast transmission manner and the multicast transmission manner;

wherein the program includes instructions for:
receiving, from the UE, a time difference between a first time at which the UE receives a first RTP packet before the RTP packet receiving manner of the UE is switched from the first transmission manner to the second transmission manner, and a second time at which the UE receives a second RTP packet after the RTP packet receiving manner of the UE is switched from the first transmission manner to the second transmission manner;

calculating, according to the time difference, a delay difference to adjust the transmission delay difference between the unicast transmission manner and the multicast transmission manner for RTP packet transmission to the UE after the RTP packet receiving manner of the UE is switched from the first transmission manner to the second transmission manner; and adjusting, according to the delay difference, a timing for the RTP packet transmission in the unicast transmission manner.

2. The device according to claim 1, wherein the instructions for obtaining the time difference comprise instructions for obtaining a plurality of time differences for a plurality of switchings between the unicast transmission manner and the multicast transmission manner; and
wherein calculating the delay difference comprises:
selecting, as the delay difference, a maximum time difference from the plurality of time differences obtained; or
determining an average value of multiple obtained time differences of the plurality of time differences, and using the average value as the delay difference.

3. The device according to claim 1, wherein the instructions for adjusting comprise instructions for delaying, according to the delay difference, a timing of RTP packet transmission in the unicast transmission manner.

4. The device according to claim 1, wherein the first RTP packet is a last RTP packet that is received by the UE on a first transmission path used before the receiving manner switching, and before a path switching of an RTP packet receiving path, and the second RTP packet is an initial RTP packet that is received by the UE on a second transmission path used after the receiving manner switching of the RTP packet receiving manner, and after the path switching of the RTP packet receiving path; and
wherein the second transmission path is different from the first transmission path.

5. The device according to claim 1, wherein the instructions for obtaining the time difference comprise instructions for:
receiving UE reported information that comprises a first timestamp identifier of the first RTP packet received by the UE and a second timestamp identifier of the second RTP packet received by the UE, or the time difference; and
when the UE reported information comprises the first timestamp identifier and the second timestamp identifier, determining the time difference between the first RTP packet and the second RTP packet, according to the first timestamp identifier and the second timestamp identifier; and
wherein, when the UE reported information comprises the time difference that is between the first RTP packet and the second RTP packet, the time difference is calculated by the UE according to the first timestamp identifier and the second timestamp identifier.

6. The device according to claim 5, further comprising an interface, wherein the program further includes instructions for sending, by the interface, a notification message for triggering a transmission to the device, of a measurement result reported by the UE, wherein the measurement result comprises the UE reported information.

7. The device according to claim 6, wherein the instructions for sending the notification message comprises instructions for sending the notification message, by the interface, by using a GC1 interface signaling message that is sent directly to the UE, or by using a broadcast/multicast service center (BM-SC) that is separate from the UE and the device.

8. The device according to claim 6, wherein the notification message comprises a request for a quality of experience metric, wherein the instructions for receiving the UE reported information comprise instructions for receiving, by the interface, the quality of experience metric that carries the measurement result that is reported by the UE.

9. The device according to claim 8, wherein the instructions for receiving the quality of experience metric reported by the UE comprises instructions for receiving the quality of experience metric by using a GC1 interface signaling message, or by using Hypertext Transfer Protocol (HI IP), or by using a broadcast/multicast-service center (BM-SC).

10. A user equipment (UE), comprising:
a processor;
a non-transitory computer-readable storage medium storing a program to be executed by the processor, wherein the program includes instructions for measuring, when the UE switches a Real-Time Transport Protocol (RTP) packet receiving manner in a receiving manner switching between a unicast transmission manner and a multicast transmission manner, a first timing of a first RTP packet received by the UE before the RTP packet receiving manner is switched from one of the unicast transmission manner and the multicast transmission manner to the other one of the unicast transmission manner and the multicast transmission manner, and a second timing of a second RTP packet received by the UE after the RTP packet receiving manner is switched from the one of the unicast transmission manner and the multicast transmission manner to the other one of the unicast transmission manner and the multicast transmission manner; and
an interface that is configured to report, to a device that is separate from the UE, a measurement result obtained by measuring the first timing of the first RTP packet and the second timing of the second RTP packet, the measurement result enabling the device to
adjust, according to the measurement result, a third timing of RTP packet transmission for use in the unicast transmission manner after the RTP packet receiving manner is switched.

11. The UE according to claim 10, wherein the instructions further comprise instructions for obtaining a first timestamp identifier of the first RTP packet received by the UE before the receiving manner switching, and a second timestamp identifier of the second RTP packet received by the UE after the receiving manner switching; and then performing one of the following:
   providing, to the interface, the measurement result comprised of the first timestamp identifier, and the second timestamp identifier; or
   determining a time difference according to the first timestamp identifier and the second timestamp identifier, and providing, to the interface, the measurement result comprised of the time difference.

12. The UE according to claim 10, wherein the first RTP packet is a last RTP packet that is received by the UE on a first transmission path used before the receiving manner switching, and before a path switching of an RTP packet receiving path, and the second RTP packet is an initial RTP packet that is received on a second transmission path used after the receiving manner switching of the RTP packet receiving manner between the unicast transmission manner and the multicast transmission manner; and
   wherein the second transmission path is different from the first transmission path.

13. The UE according to claim 10, wherein the interface is further configured to:
   receive a notification message sent by the device; and
   in response to the notification message, and before reporting the measurement result to the device:
     send a request to the processor to begin executing the program; and
     receive the measurement result from the processor.

14. The UE according to claim 13, wherein the interface is configured to receive the notification message that is transmitted to the UE in a GC1 interface signaling message, or via a broadcast/multicast service center BM-SC.

15. The UE according to claim 13, wherein the notification message comprises a quality of experience metric, and the measurement result is carried in the quality of experience metric that is reported by the interface to the device.

16. The UE according to claim 15, wherein the interface is configured to report to the device, the quality of experience metric that carries the measurement result, by using a GC1 interface signaling message, Hypertext Transfer Protocol (HTTP), or a broadcast/multicast-service center (BM-SC).

* * * * *